United States Patent
Takenouchi et al.

(10) Patent No.: US 8,284,710 B2
(45) Date of Patent: Oct. 9, 2012

(54) COMMUNICATION TERMINAL DEVICE, COMMUNICATION SYSTEM, RELAYING-DEVICE SELECTING DEVICE, COMMUNICATION METHOD, AND PROGRAM

(75) Inventors: Takao Takenouchi, Tokyo (JP); Naoko Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 12/864,055

(22) PCT Filed: Feb. 2, 2009

(86) PCT No.: PCT/JP2009/051715
§ 371 (c)(1),
(2), (4) Date: Jul. 22, 2010

(87) PCT Pub. No.: WO2009/110271
PCT Pub. Date: Sep. 11, 2009

(65) Prior Publication Data
US 2010/0296435 A1    Nov. 25, 2010

(30) Foreign Application Priority Data
Mar. 3, 2008  (JP) .................................. 2008-052600

(51) Int. Cl.
*H04J 1/10* (2006.01)
*H04J 3/08* (2006.01)

(52) U.S. Cl. ......... 370/315; 370/351; 370/392; 709/245

(58) Field of Classification Search .................. 370/315, 370/351, 392; 709/245
See application file for complete search history.

(56) References Cited

U.S. PATENT DOCUMENTS

| | | | |
|---|---|---|---|
| 2003/0133554 A1* | 7/2003 | Nykanen et al. | 379/201.01 |
| 2006/0265587 A1* | 11/2006 | Son et al. | 713/162 |
| 2008/0270626 A1* | 10/2008 | Takeda et al. | 709/238 |

FOREIGN PATENT DOCUMENTS

WO    2005048011 A    5/2005

OTHER PUBLICATIONS

International Search Report for PCT/JP2009/051715 mailed Apr. 7, 2009.
P. Srisuresh et al., "Traditional IP Network Address Translator (Traditional NAT)", Network Working Group, RFC 3022. Jan. 2001, pp. 1-16.

* cited by examiner

*Primary Examiner* — Luat Phung

(57) ABSTRACT

In order to perform communication while configuring a disclosure level on an attribute of a user to be disclosed to a communication destination to a designated disclosure level, there is provided a communication relaying device selecting means (2) that selects, among a plurality of communication relaying devices (401-403) capable of relaying communication to a communication destination terminal (501), a communication relaying device corresponding to a disclosure level designated as the disclosure level on the attribute of the user from among disclosure levels in multiple steps. There is provided a communication means (4) that communicates to the communication destination terminal (501) through the communication relaying device selected by the communication relaying device selecting means (2).

27 Claims, 22 Drawing Sheets

|  | COMMUNICATION RELAYING DEVICE IP ADDRESS | DISCLOSURE LEVEL |
|---|---|---|
| FIRST COMMUNICATION RELAYING DEVICE | 1.1.1.1 | NON-DISCLOSURE |
| SECOND COMMUNICATION RELAYING DEVICE | 2.2.2.2 | COMPANY |
| THIRD COMMUNICATION RELAYING DEVICE | 3.3.3.3 | DEPARTMENT |

Fig. 4

| DISCLOSURE LEVEL | LOWER DISCLOSURE LEVEL |
|---|---|
| NON-DISCLOSURE | COMPANY |
| COMPANY | DEPARTMENT |
| DEPARTMENT | NONE |

Fig. 7

|  | COMMUNICATION RELAYING DEVICE IP ADDRESS | DISCLOSURE LEVEL |
|---|---|---|
| FIRST COMMUNICATION RELAYING DEVICE | 1.1.1.1 | NON-DISCLOSURE |
| SECOND COMMUNICATION RELAYING DEVICE | 2.2.2.2 | COMPANY |

Fig. 11

| DISCLOSURE LEVEL | HIGHER DISCLOSURE LEVEL |
|---|---|
| NON-DISCLOSURE | NONE |
| COMPANY | NON-DISCLOSURE |
| DEPARTMENT | COMPANY |

Fig. 12

COMMUNICATION TERMINAL DEVICE, COMMUNICATION SYSTEM, RELAYING-DEVICE SELECTING DEVICE, COMMUNICATION METHOD, AND PROGRAM

This application is the National Phase of PCT/JP2009/051715, filed Feb. 2, 2009, which is based upon and claims the benefit of priority from Japanese patent application No.2008-052600, filed on Mar. 3, 2008, the disclosure of which is incorporated herein in its entirety by reference.

TECHNICAL FIELD

The present invention relates to a communication terminal device, a communication system, a relaying-device selecting device, a communication method, and a program.

BACKGROUND ART

There has been proposed a method where a communication relaying device relays communication between a device of a user and a device of a communication destination without a direct communication therebetween when the user communicates with the communication destination, thereby concealing a communication identifier used for the communication by the user from the communication destination.

As a related art document disclosing an example of a communication system which uses such a communication relaying device, there is known, e.g. Non-Patent Document 1.

Non-Patent Document 1 discloses a communication system which uses a NAT (Network Address Translation) function as the communication relaying device.

The NAT is a technology used in communication, to which IP (Internet Protocol) used for the Internet is applied, and translates a communication identifier for identifying a communication destination or a communication source. For example, a process to mutually translate a global IP address which is unique on the Internet and a local IP address which is unique within a division is performed.

A communication relaying device which uses the NAT relays communication when the device of the user communicates with the device of the communication destination in a case where the user has a local IP address, for example, and performs a process to translate the local IP address of the device of the user into a global IP address.

In contrast, when the device of the communication destination communicates to the user, the global IP address is translated into the local address of the user. Thus, when the device of the user communicates with the device of the communication destination, it is possible to communicate without disclosing the local IP address which is an IP address of the device of the user to the communication destination, so that it is possible to make it difficult to acquire information on the user from the local IP address.

[Non-Patent Document 1]
P. Srisuresh, "Traditional IP Network Address Translator (Traditional NAT)" RFC3022, January, 2001

DISCLOSURE OF INVENTION

Technical Problems

A first problem is that an attribute of a user, such that the user belongs to which organization, could be guessed by a communication destination from a communication identifier of a communication relaying device itself which relays communication between the user and the communication destination.

In a communication system using the conventional communication relaying device, the communication relaying device can conceal a communication identifier of the user from the communication destination. However, the communication identifier of the communication relaying device cannot be concealed from the communication destination, so that user information could be guessed from the communication identifier of the communication relaying device itself.

For example, considering that communication to which the IP is applied, the communication relaying device, the user, and the communication destination each use the IP address as the communication identifier. Allocation of the IP address is partly decided per organization, so that it is possible to determine which organization an IP address of the communication relaying device is allocated to. Further, because the user uses its communication relaying device, it is possible to determine that there is a high possibility that the user also belongs to its organization. In this way, it is guessed which organization the user belongs to. Furthermore, when the IP address can be translated into a domain name by DNS (Domain Name Service), it is also possible to determine location information such as country information from the domain name. Therefore, it is similarly guessed which country the user is in.

A second problem is that the user cannot control a disclosure level on the attribute of the user, which is guessed by the communication destination from the communication identifier.

For example, in a case where the communication destination performs access control in accordance with a communication identifier of an access source, and permits to access only when the access source belongs to the same company as the communication destination, it is necessary to disclose to the communication destination that the user belongs to the same company. However, it is not necessary to disclose to the communication destination more detailed information than "company", such that the user belongs to which department within the company. In such a case, it is desirable that the user can perform control to disclose the attribute of the user to the communication destination at which level. In the communication system using the conventional communication relaying device, for example, if all users use the same communication relaying device or can freely use a communication relaying device independent of the organization, the first problem could be solved. However, in such a method, it is not possible that the user controls the disclosure level on the attribute of the user. Namely, it is not possible to solve the second problem.

The present invention has been made to solve the problems as mentioned above, and aims to provide a communication terminal device, a communication system, a relaying-device selecting device, a communication method, and a program, which can perform communication while configuring a disclosure level on an attribute of a user to be disclosed to a communication destination to a designated disclosure level.

Technical Solution

In order to solve the above-mentioned problems, a communication terminal device according to the present invention includes: a communication relaying device selecting means for selecting a communication relaying device corresponding to a disclosure level designated as a disclosure level on an attribute of a user from among disclosure levels in multiple steps, among a plurality of communication relaying devices capable of relaying communication to a communication destination terminal; and a communication means for communicating to the communication destination terminal thorough the communication relaying device selected by the communication relaying device selecting means. An attribute of the user disclosed to the communication destination terminal at each disclosure level includes an attribute of the user disclosed at a disclosure level with a lower disclosure degree than each disclosure level.

Further, another communication terminal device according to the present invention includes: a communication relaying device existence/non-existence determining means for determining existence or non-existence of a communication relaying device corresponding to a disclosure level designated as a disclosure level on an attribute of a user from among disclosure levels in multiple steps, among a plurality of communication relaying devices capable of relaying communication to a communication destination terminal; a communication relaying device selecting means for selecting a communication relaying device corresponding to the designated disclosure level when it is determined that the communication relaying device corresponding to the designated disclosure level exists, and for selecting a communication relaying device corresponding to a disclosure level with a lower disclosure degree on the attribute of the user than the designated disclosure level when it is determined that the communication relaying device corresponding to the designated disclosure level does not exist; and a communication means for communicating to the communication destination terminal thorough the communication relaying device selected by the communication relaying device selecting means. An attribute of the user disclosed to the communication destination terminal at each disclosure level includes an attribute of the user disclosed at a disclosure level with a lower disclosure degree than each disclosure level.

Further, another communication terminal device according to the present invention includes: a move schedule storing means for storing a move schedule of a user; a move schedule determining means for determining whether or not a date of the move schedule stored in the move schedule storing means has arrived; a communication relaying device selecting means for changing a communication relaying device to be selected from among a plurality of communication relaying devices that are capable of relaying communication to a communication destination terminal and that respectively correspond to disclosure levels in multiple steps on an attribute of the user, between when it is determined that the date of the move schedule has not arrived and when it is determined that the date of the move schedule has arrived; and a communication means for communicating to the communication destination terminal through the communication relaying device selected by the communication relaying device selecting means. An attribution of the user disclosed to the communication destination terminal at each disclosure level includes an attribution of the user disclosed at a disclosure level with a lower disclosure degree than each disclosure level. For example, the communication relaying device selecting means selects, when it is determined that the date of the move schedule has not arrived, a communication relaying device corresponding to a disclosure level designated from among the disclosure levels in multiple steps, among the plurality of communication relaying devices, and selects, when it is determined that the date of the move schedule has arrived, a communication relaying device corresponding to a disclosure level with a lower disclosure degree on the attribute of the user than the designated disclosure level, among the plurality of communication relaying devices.

Further, a communication system according to the present invention includes: a communication terminal device; and a plurality of communication relaying devices capable of relaying communication from the communication terminal device to a communication destination terminal, without disclosing a communication identifier of the communication terminal device to the communication destination terminal. Each communication relaying device corresponds to any one of disclosure levels in multiple steps on an attribute of a user. The communication terminal device includes: a communication relaying device selecting means for selecting a communication relaying device corresponding to a disclosure level designated from among the disclosure levels in multiple steps, among the plurality of communication relaying devices; and a communication means for communicating to the communication destination terminal thorough the communication relaying device selected by the communication relaying device selecting means. An attribute of the user disclosed to the communication destination terminal at each disclosure level includes an attribute of the user disclosed at a disclosure level with a lower disclosure degree than each disclosure level.

Further, another communication system according to the present invention includes: a communication terminal device; and a plurality of communication relaying devices capable of relaying communication from the communication terminal device to a communication destination terminal, without disclosing a communication identifier of the communication terminal device to the communication destination terminal. Each communication relaying device corresponds to any one of disclosure levels in multiple steps on an attribute of a user. The communication terminal device includes: a communication relaying device existence/non-existence determining means for determining existence or non-existence of a communication relaying device corresponding to a disclosure level designated from among the disclosure levels in multiple steps, among the plurality of communication relaying devices; a communication relaying device selecting means for selecting a communication relaying device corresponding to the designated disclosure level when it is determined that the communication relaying device corresponding to the designated disclosure level exists, and for selecting a communication relaying device corresponding to a disclosure level with a lower disclosure degree on the attribute of the user than the designated disclosure level when it is determined that the communication relaying device corresponding to the designated disclosure level does not exist, and a communication means for communicating to the communication destination terminal thorough the communication relaying device selected by the communication relaying device selecting means. An attribute of the user disclosed to the communication destination terminal at each disclosure level includes an attribute. of the user disclosed at a disdosure level with a lower disclosure degree than each disclosure level.

Further, another communication system according to the present invention includes: a communication terminal device; and a plurality of communication relaying devices capable of relaying communication from the communication terminal device to a communication destination terminal, without disclosing a communication identifier of the communication terminal device to the communication destination terminal. Each communication relaying device corresponds to any one of disclosure levels in multiple steps on an attribute of a user. The communication terminal device includes: a move schedule storing means for storing a move schedule of the user; a move schedule determining means for determining whether or not a date of the move schedule stored in the move schedule storing means has arrived; a communication relaying device selecting means for changing a communication relaying device to be selected among the plurality of communication relaying devices, between when it is determined that the date of the move schedule has not arrived and when it is determined that the date of the move schedule has arrived; and a communication means for communicating to the communication destination terminal through the communication relaying device selected by the communication relaying device selecting means. An attribution of the user disclosed to the communication destination terminal at each disclosure level includes an attribution of the user disclosed at a disclosure level with a lower disclosure degree than each disclosure level. For example, the communication relaying device selecting means selects, when it is determined that the date of the move schedule has not arrived, a communication relaying device corresponding to a disclosure level designated from among the disclosure levels in multiple steps, among the plurality of communication relaying devices, and selects, when it is determined that the date of the move schedule has arrived, a communication relaying device corresponding to a disclosure level with a lower disclosure degree on the attribute of the user than the designated disclosure level, among the plurality of communication relaying devices.

Further, another communication system according to the present invention includes: a communication terminal device; a plurality of communication relaying devices capable of relaying communication from the communication terminal device to a communication destination terminal, without disclosing a communication identifier of the communication terminal device to the communication destination terminal; and a relaying-device selecting device that selects a communication relaying device for relaying the communication from the communication terminal device to the communication destination terminal from among the plurality of communication relaying devices. Each communication relaying device corresponds to any one of disclosure levels in multiple steps on an attribute of a user. The relaying-device selecting device selects a communication relaying device corresponding to a disclosure level designated from among the disclosure levels in multiple steps, among the plurality of communication relaying devices. The communication terminal device includes a communication means for communicating to the communication destination terminal thorough the communication relaying device selected by the relaying-device selecting device. An attribute of the user disclosed to the communication destination terminal at each disclosure level includes an attribute of the user disclosed at a disclosure level with a lower disclosure degree than each disclosure level.

Further, a relaying-device selecting device according to the present invention selects, among a plurality of communication relaying devices capable of relaying communication from a communication terminal device to a communication destination terminal, a communication relaying device corresponding to a disclosure level designated as a disclosure level on an attribute of a user of the communication terminal device from among disclosure levels in multiple steps, and notifies the communication terminal device of a result of the selection. An attribute of the user disclosed to the communication destination terminal at each disclosure level includes an attribution of the user disclosed at a disclosure level with a lower disclosure degree than each disclosure level.

Further, a communication method according to the present invention includes: a first step of selecting, among a plurality of communication relaying devices capable of relaying communication from a communication terminal device to a communication destination terminal, a communication relaying device corresponding to a disclosure level designated as a disclosure level on an attribute of a user of the communication terminal device from among disclosure levels in multiple steps; and a second' step of communicating, by the communication terminal device, to the communication destination terminal through the communication relaying device selected at the first step. This communication method uses, as each communication relaying device, a device that discloses an attribute of the user including an attribute disclosed by a communication relying device corresponding to a disclosure level with a lower disclosure degree than each disclosure level to the communication destination terminal.

A program according to the present invention causes a computer to execute a process to select, among a plurality of communication relaying devices capable of relaying communication from a communication terminal device to a communication destination terminal, a communication relaying device corresponding to a disclosure level designated as a disclosure level on an attribute of a user of the communication terminal device from among disclosure levels in multiple steps. This program causes the computer to select, as each communication relaying device, a device that discloses an attribute of the user including an attribution disclosed by a communication relying device corresponding to a disclosure level with a lower disclosure degree than each disclosure level to the communication destination terminal.

ADVANTAGEOUS EFFECTS

According to the present invention, it is possible to perform communication while configuring a disclosure level on an attribute of a user to be disclosed to a communication destination to a designated disclosure level.

BRIEF DESCRIPTION OF DRAWINGS

FIG. 4 is a diagram showing a correspondence between each of communication relaying devices, and its IP address and disclosure level;

FIG. 7 is a diagram showing an example of disclosure level hierarchy information which is stored in a disclosure level hierarchy information storing area;

FIG. 11 is a diagram showing a correspondence table which is stored in a communication relaying device information storing area in the case of the third exemplary embodiment;

FIG. 12 is a diagram showing an example of disclosure level hierarchy information which is stored in a disclosure level hierarchy information storing area in the case of the third exemplary embodiment.

EXPLANATION OF REFERENCE

1 OPERATIONAL UNIT (OPERATIONAL MEANS)
2 CONTROLLER (COMMUNICATION RELAYING DEVICE SELECTING MEANS, DISCLOSURE LEVEL INQUIRING MEANS, DISCLOSURE DEGREE ENHANCEMENT INQUIRING MEANS, COMMUNICATION RELAYING DEVICE EXISTENCE/NON-EXISTENCE DETERMINING MEANS, MOVE SCHEDULE DETERMINING MEANS)
4 COMMUNICATOR (COMMUNICATION MEANS)
9 DISCLOSURE LEVEL INFORMATION STORING AREA (DISCLOSURE LEVEL STORING MEANS)
10 COMMUNICATION RELAYING DEVICE INFORMATION STORING AREA (COMMUNICATION RELAYING DEVICE INFORMATION STORING MEANS)
11 COMMUNICATION RELAYING DEVICE CONFIGURATION INFORMATION STORING AREA (COMMUNICATION RELAYING DEVICE IDENTIFIER STORING MEANS)
13 USER MOVE SCHEDULE INFORMATION STORING AREA (MOVE SCHEDULE STORING MEANS)
300 USER TERMINAL (COMMUNICATION TERMINAL DEVICE)
401 COMMUNICATION RELAYING DEVICE
402 COMMUNICATION RELAYING DEVICE
403 COMMUNICATION RELAYING DEVICE
501 COMMUNICATION DESTINATION TERMINAL
600 RELAYING-DEVICE SELECTING DEVICE

BEST MODES FOR CARRYING OUT THE INVENTION

Hereinafter, exemplary embodiments will be described with reference to the drawings.

[First Exemplary Embodiment]

In a first exemplary embodiment, an example is described where an attribute of a user is disclosed from a user terminal (communication terminal device) to a communication destination terminal only at a disclosure level preliminarily configured in the user terminal upon performing communication from the user terminal to the communication destination terminal.

Therefore, in this exemplary embodiment, the user terminal selects a suitable communication relaying device from among a plurality of communication relaying devices in accordance with the configured disclosure level, and performs communication from the user terminal to the communication destination terminal through the selected communication relaying device.

Note that in the first exemplary embodiment, a case where Internet access is performed as the communication from the user terminal to the communication destination terminal is described.

Figure 1:
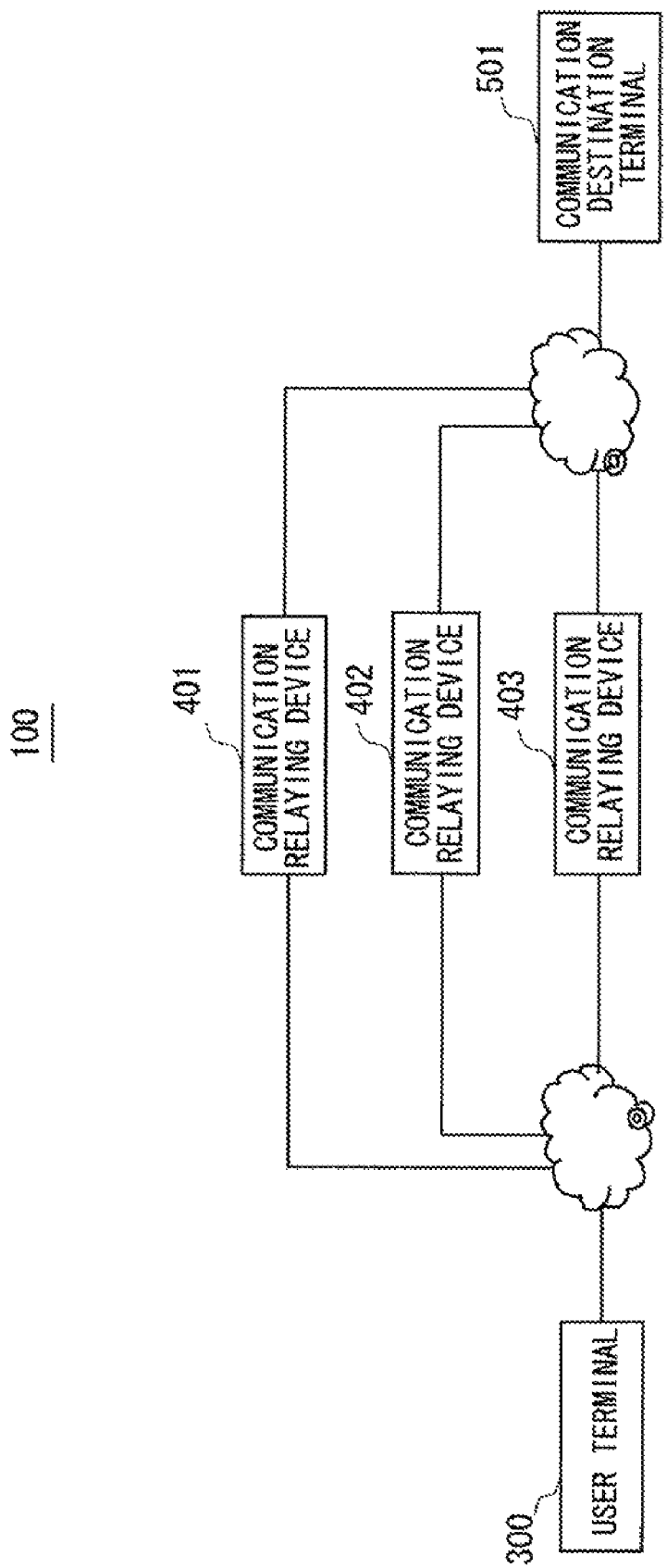
FIG. 1 is a block diagram showing a configuration of a communication system according to a first exemplary embodiment.

FIG. 1 is a block diagram showing a configuration of a communication system 100 according to the first exemplary embodiment.

As shown in FIG. 1, the communication system 100 includes a user terminal (communication terminal device) 300, a communication destination terminal 501 which is a communication destination of the user terminal 300, and a plurality of (e.g. three) communication relaying devices 401, 402 and 403 which relay communication from the user terminal 300 to the communication destination terminal 501.

Figure 2:
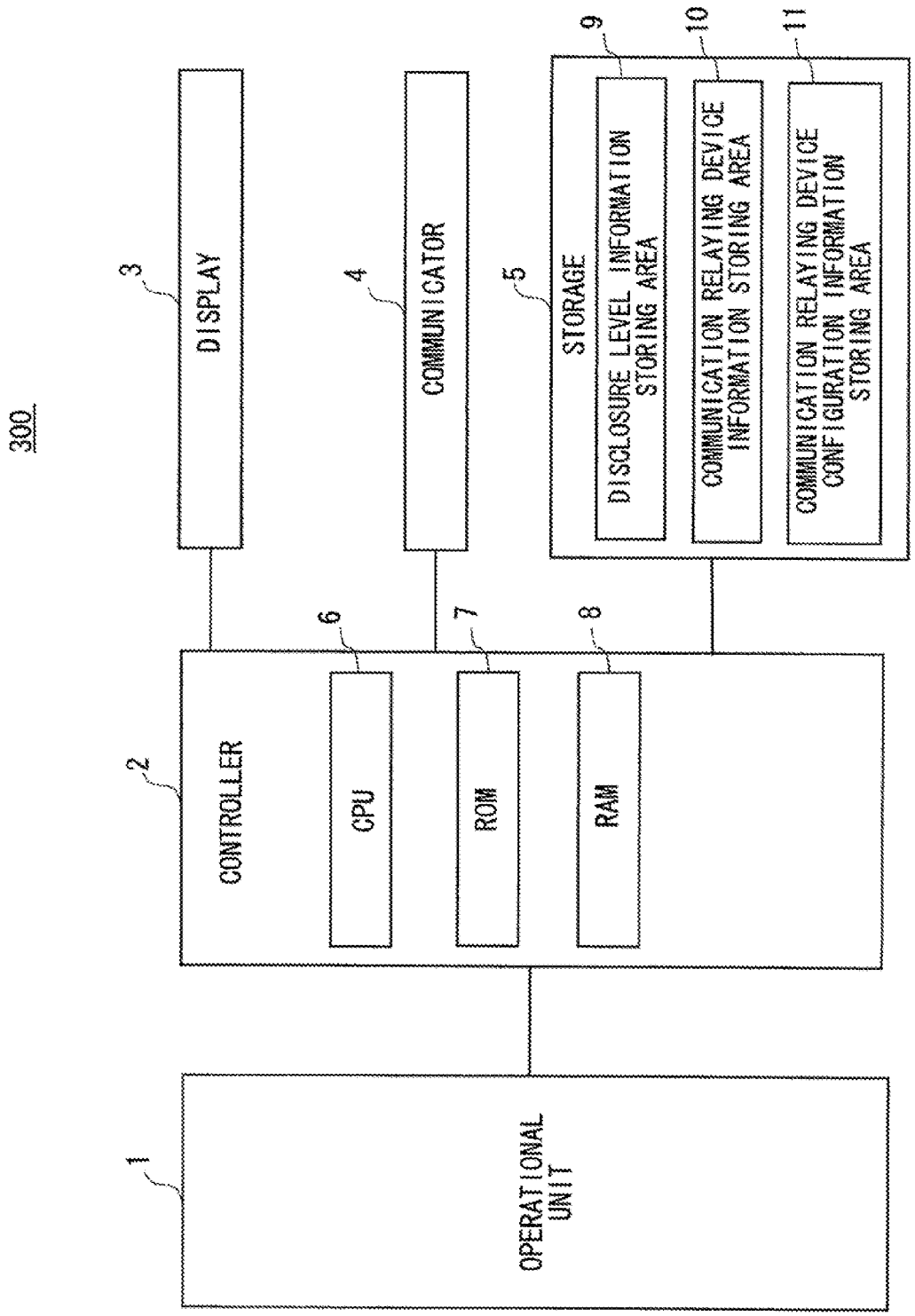
FIG. 2 is a block diagram showing a configuration of a user terminal in the case of the first exemplary embodiment.

FIG. 2 is a block diagram showing a configuration of the user terminal 300.

As shown in FIG. 2, the user terminal 300 includes an operational unit (operational means) 1 which accepts operation by a user, a controller 2, a display 3 which performs various display actions, a communicator (communication means) 4 which performs communication with the communication relaying devices 401 to 403, and a storage 5 which stores data.

Among them, the controller 2 includes a CPU (Central Processing Unit) 6 which performs various control actions, a ROM (Read Only Memory) 7 which stores a program for the actions of the CPU 6 or the like, and a RAM (Random Access Memory) 8 which operates as a work area of the CPU 6 or the like.

The control actions performed by the CPU 6 in the controller 2 include display control to make the display 3 perform the display actions, communication control to make the communicator 4 perform the communication, storage control to make the storage 5 store the data and the like, in addition to control to select the communication relaying device.

The storage 5 includes a disclosure level storing area 9, a communication relaying device information storing area 10, and a communication relaying device configuration information storing area 11.

The disclosure level storing area (disclosure level storing means) 9 stores and holds information which indicates a disclosure level configured (designated) by the user.

Further, the communication relaying device information storing area (communication relaying device information storing means) 10 stores and holds a correspondence table (refer to FIG. 4) between an IP address as a communication identifier of each of the communication relaying devices 401 to 403, and the disclosure level.

Furthermore, the communication relaying device configuration information storing area (communication relaying device identifier storing means) 11 stores and holds an IP address of a communication relaying device corresponding to the disclosure level configured by the user (any one of the communication relaying devices 401 to 403).

Figure 3:
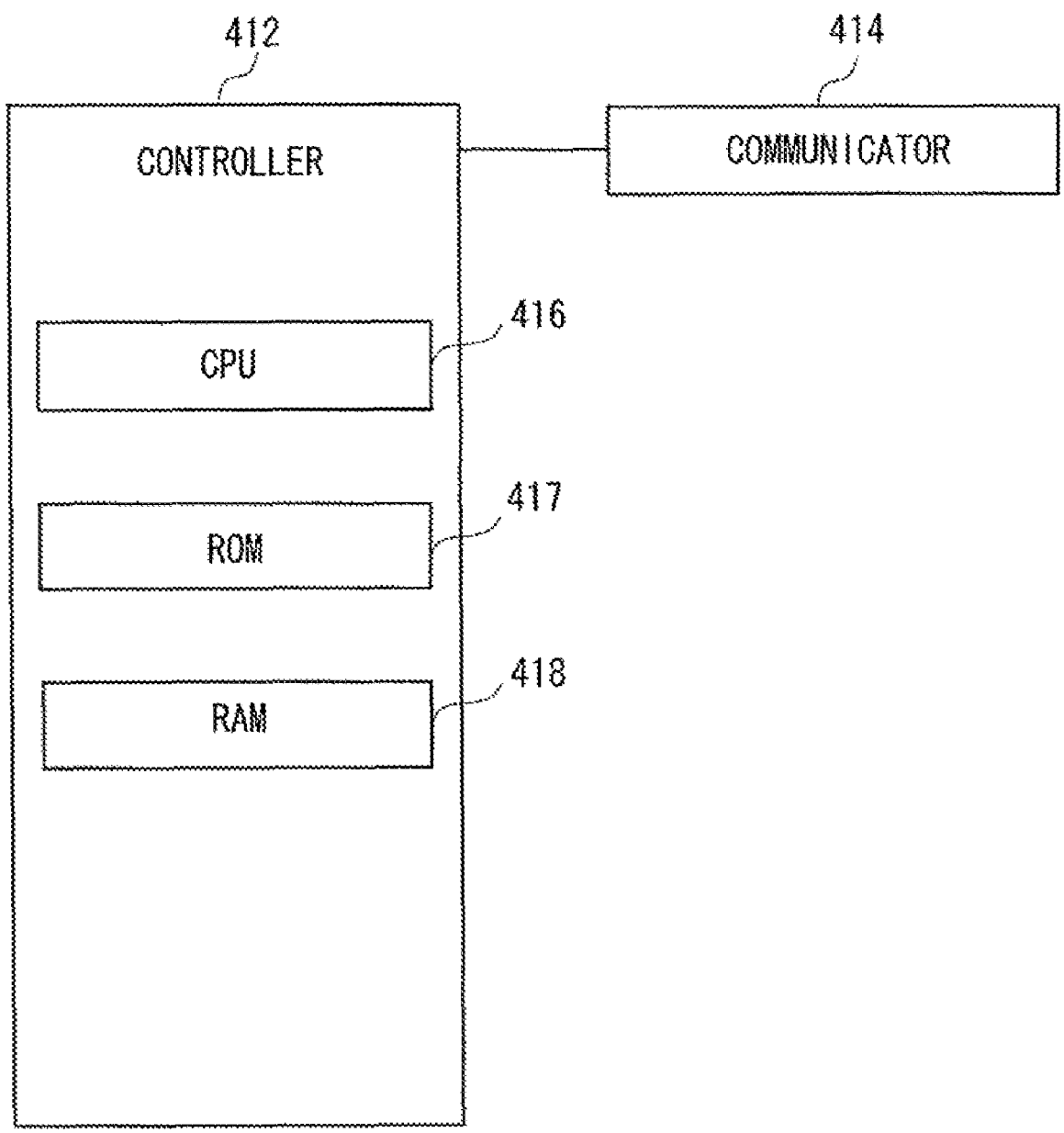
FIG. 3 is a block diagram showing a configuration of a communication relaying device in the case of the first exemplary embodiment.

FIG. 3 is a diagram showing a configuration of each of the communication relaying devices 401 to 403.

As shown in FIG. 3, each of the communication relaying devices 401 to 403 includes a controller 412 which performs control actions, and a communicator 414 which performs communication.

The controller 412 includes a CPU 416 which performs various control actions, a ROM 417 which stores a program for the actions of the CPU 416 or the like, and a RAM 418 which operates as a work area of the CPU 416 or the like.

The control actions performed by the CPU 416 in the controller 412 includes communication control to make the communicator 414 perform the communication and the like.

Next, the disclosure level on the attribute of the user is described in detail.

In a case of this exemplary embodiment, as the disclosure level on the attribute of the user, any one of three levels "Non-disclosure", "Company", and "Department", for example, can be selected by user operation.

These disclosure levels indicate how much to disclose the attribute of the user (how in detail the attribute of the user can be made known) to the communication destination which is a transmission destination of data from the user.

The disclosure level "Non-disclosure" means that the attribute of the user is not disclosed at all to the communication destination.

The disclosure level "Company" means that the company that the user belongs to may be made known (or guessed) by the communication destination.

The disclosure level "Department" means that the company and department that the user belongs to may be made known (or guessed) by the communication destination.

Further, the disclosure levels are hierarchical. If an attribute of the user at a disclosure level in a low hierarchy can be known, an attribute of the user at a disclosure level in an upper hierarchy can be also known. For example, "Company" is in an upper hierarchy than "Department", and "Department" is in a lower hierarchy than "Company". Therefore, from the attribute of the user at the disclosure level "Department", not only the department that the user belongs to, but also the company that the user belongs to can be known.

In contrast, from the attribute of the user at the disclosure level in the upper hierarchy, an attribute of the user at a disclosure level in a lower hierarchy cannot be known. That is, from the attribute of the user at the disclosure level "Company", the attribute of the user at the disclosure level "Department" cannot be known.

In the case of this exemplary embodiment, hierarchies of the disclosure levels are "Non-disclosure", "Company", and "Department" in order from the highest hierarchy.

Note that "Company" corresponds to a specific organization, and "Department" corresponds to a lower organization thereof.

Further, each disclosure level is associated with each of the communication relaying devices 401 to 403 (e.g. on one-to-one basis).

FIG. 4 is a diagram showing a correspondence between the first to third communication relaying devices 401 to 403, and their IP addresses and disclosure levels.

As shown in FIG. 4, for example, the first communication relaying device 401, of which IP address is "1.1.1.1", corresponds to the disclosure level "Non-disclosure".

Further, the second communication relaying device 402, of which IP address is "2.2.2.2", corresponds to the disclosure level "Company".

Furthermore, the third communication relaying device 403, of which IP address is "3.3.3.3", corresponds to the disclosure level "Department".

Note that all of the IP addresses "1.1.1.1", "2.2.2.2", and "3.3.3.3" of the first to third communication relaying devices 401 to 403 are obviously the convenient ones for simplifying the description.

The first communication relaying device 401 is the one which can be accessed from any user. That is, it can be accessed not only from users who belong to a certain specific company, but also from an unspecified number of other users. Accordingly, the communication destination terminal 501 (user thereof), which has received data through the first communication relaying device 401, cannot know the attribute of the user who is a transmission source of the data.

Namely, the user of the communication destination terminal 501 can know the IP address of the first communication relaying device 401 (e.g. "1.1.1.1" as shown in FIG. 4), but cannot know the attribute of the user who is the transmission source of the data, because the first communication relaying device 401 can be accessed from everyone.

Thus, when the user of the user terminal 300 configures the disclosure level "Non-disclosure", the user terminal 300 selects the first communication relaying device 401, which performs communication without disclosing any attribute of the user to the communication destination, and transmits data to the communication destination terminal 501 through the first communication relaying device 401 selected.

Further, the second communication relaying device 402 is the one which can be accessed only from users who belong to a certain company "A". Therefore, users who do not belong to the company "A" cannot access the second communication relaying device 402. Note that the second communication relaying device 402 can be accessed from anyone who belongs to the company "A", regardless of the department within the company "A" to which the user belongs. The "access" means that the user terminal 300 connects to the communication relaying devices 401 to 403 in order to transmit data to the communication destination terminal 501. Assume that the "access" does not include that the communication destination terminal 501 receives the data from the communication relaying devices 401 to 403.

Accordingly, the communication destination terminal 501 (user thereof), which has received the data through the second communication relaying device, can find out that the user who is the transmission source of the data belongs to the company "A".

Namely, the user of the communication destination terminal 501 can know that the user who is the transmission source of the data is the one who belongs to the company "A", from the IP address of the second communication relaying device 402 (e.g. "2.2.2.2" as shown in FIG. 4).

Thus, when the user of the user terminal 300 configures the disclosure level "Company", the user terminal 300 selects the second communication relaying device 402, which performs communication so at to disclose the company to which the user belongs to the communication destination, and transmits data to the communication destination terminal 501 through the second communication relaying device 402 selected.

Further, the third communication relaying device 403 is the one which can be accessed only from users who belong to a certain department "AA" within a certain company "A". Therefore, the third communication relaying device 403 cannot be accessed from users who do not belong to the department "AA", even if the users belong to the company "A".

Accordingly, the communication destination terminal 501 (user thereof), which has received the data through the third communication relaying device 403, can find out that the user who is the transmission source of the data belongs to the department "AA" within the company "A".

Namely, the user of the communication destination terminal 501 can know that the user who is the transmission source of the data is the one who belongs to the department "AA" within the company "A", from the IP address of the third communication relaying device 403 (e.g. "3.3.3.3" as shown in FIG. 4).

Thus, when the user of the user terminal 300 configures the disclosure level "Department", the user terminal 300 selects the third communication relaying device 403, which performs communication so as to disclose the department to which the user belongs to the communication destination, and transmits data to the communication destination terminal 501 through the third communication relaying device 403 selected.

It is described how the user of the destination terminal 501 can know the attribute of the user who is the transmission source of the data from the IP address "2.2.2.2" of the second communication relaying device 402.

For example, assume that it is decided that IP addresses of communication relaying devices used at the company "A" range from one number to another number, and that, within the range, IP addresses of communication relaying devices used at the department "AA" range from one number to another number.

Further, assume that regarding "IP addresses of communication relaying devices used at the company "A" range from one number to another number", a list indicating its contents is publicly distributed, so that its contents can be known by not only users belonging to the company "A" but also other users, for example.

Furthermore, assume that regarding "IP addresses of communication relaying devices used at the department "AA" range from one number to another number", a list indicating its contents can be known by workers in the company "A", for example.

Therefore, the user of the communication destination terminal 501 can know the attribute of the user, from the IP address of the communication relaying device.

Next, operation is described.

Figure 5:
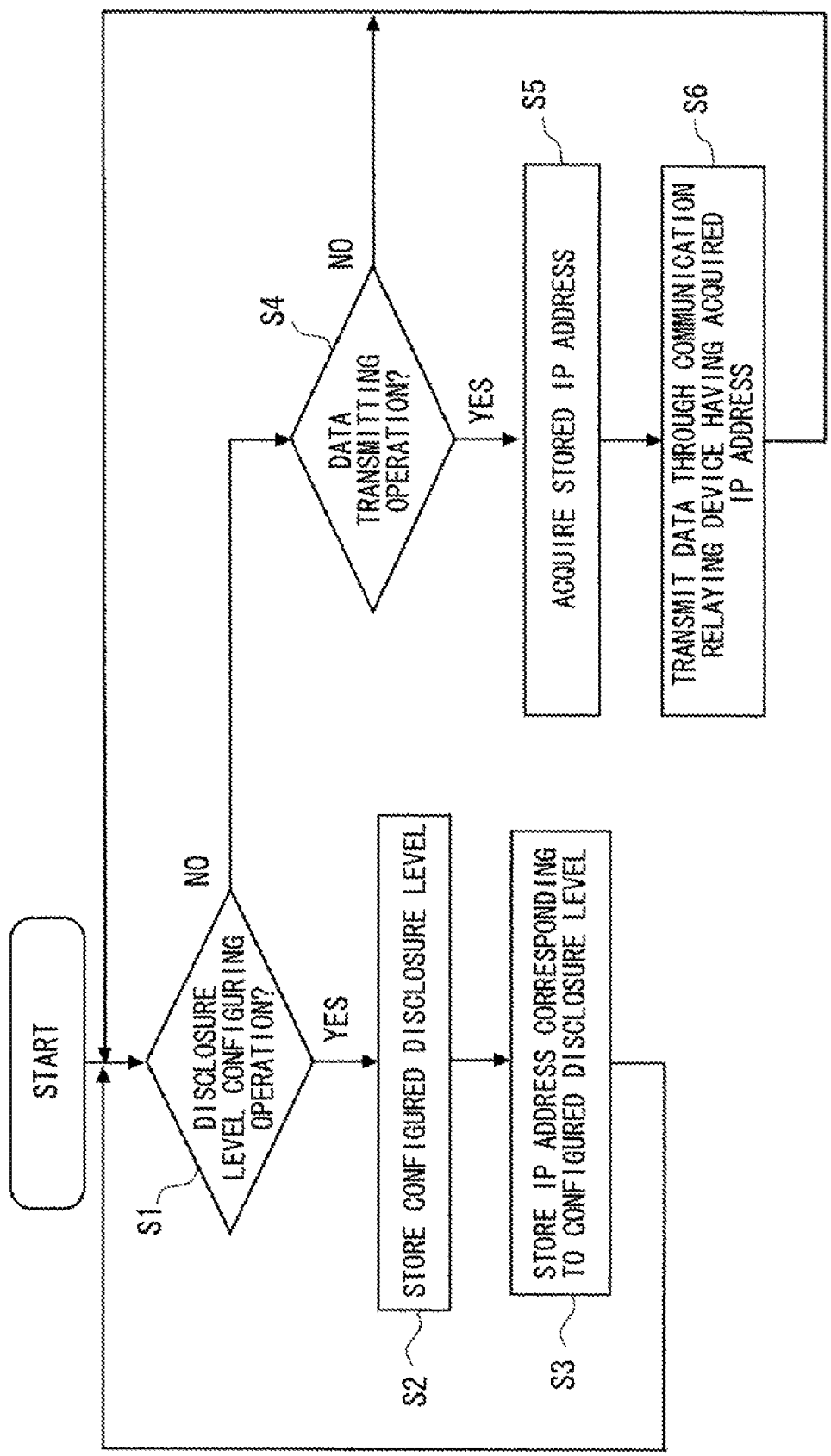
FIG. 5 is a flowchart showing operation of a user terminal in the case of the first exemplary embodiment.

FIG. 5 is a flowchart showing operation of the controller 2 in the user terminal 300.

Firstly, description is given of operation (corresponding to Steps S1 to S3 in FIG. 5) when the user of the user terminal 300 performs operation to configure the disclosure level on the attribute of the user.

The CPU 6 in the controller 2 monitors configuring operation of the disclosure level with respect to the operational unit 1 (Step S1).

When the user performs operation to configure the disclosure level (any one of "Non-disclosure", "Company", and "Department") on the operational unit 1, the CPU 6 in the controller 2 detects its operation (Yes at Step S1), and stores information which indicates the disclosure level configured by its operation in the disclosure level information storing area 9 in the storage 5 (Step S2).

Furthermore, every time the user performs the configuring operation of the disclosure level on the operational unit 1, the CPU 6 in the controller 2 selects an IP address in accordance with the disclosure level, and stores the selected IP address in the communication relaying device configuration information storing area 11.

That is, the CPU 6 refers to the correspondence table shown in FIG. 4 to acquire an IP address corresponding to the disclosure level information newly stored in the disclosure level information storing area 9, and stores the acquired IP address in the communication relaying device configuration information storing area 11 (Step S3).

For example, if the disclosure level stored in the disclosure level information storing area 9 is "Non-disclosure", it is apparent from FIG. 4 that the IP address corresponding to this disclosure level is "1.1.1.1". Therefore, the CPU 6 stores this IP address "1.1.1.1" in the communication relaying device configuration information storing area 11.

Similarly, if the disclosure level stored in the disclosure level information storing area 9 is "Company", it is apparent from FIG. 4 that the IP address corresponding to this disclosure level is "2.2.2.2". 4. Therefore, the CPU 6 stores this IP address "2.2.2.2" in the communication relaying device configuration information storing area 11.

Similarly, if the disclosure level stored in the disclosure level information storing area 9 is "Department", it is apparent from FIG. 4 that the IP address corresponding to this disclosure level is "3.3.3.3". Therefore, the CPU 6 stores this IP address "3.3.3.3" in the communication relaying device configuration information storing area 11.

In this way, the controller 2 operates as a communication relaying device selecting means.

Next, description is given of operation (corresponding to Steps S4 to S6 in FIG. 5) when the user of the user terminal 300 performs operation to perform Internet access and transmit data to the communication destination terminal 501.

The CPU 6 in the controller 2 monitors, when not detecting the configuring operation of the disclosure level (No at Step S1), whether or not operation to transmit the data to the communication destination terminal 501 is performed on the operational unit 1 (Step S4).

When the user performs the operation to transmit the data to the communication destination terminal 501 on the operational unit 1, the CPU 6 in the controller 2 detects its operation (Yes at Step S4), and acquires the IP address (any one of "1.1.1.1", "2.2.2.2", and "3.3.3.3") stored in the communication relaying device configuration information storing area 11 (Step S5). As mentioned above, this IP address is the one of the communication relaying device corresponding to the disclosure level preliminarily configured by the user.

Then, the CPU 6 outputs a command to the communicator 4, thereby making the communicator 4 transmit the data to the communication destination terminal 501 through the communication relaying device having the IP address acquired at the preceding Step S5 (Step S6).

That is, the communicator 4, which has received the command from the CPU 6, uses the IP address acquired by the CPU 6 at the preceding Step S5, and transmits the data to the communication relaying device having the IP address.

Assume that an IP address of the communication destination terminal 501 is e.g. "20.20.20.20". Note that this IP address "20.20.20.20" is also the convenient one for simplifying the description.

Upon the data transmission at Step S6, the communicator 4 also transmits the IP address "20.20.20.20" of the communication destination terminal 501 to the communication relaying device having the IP address acquired at the preceding Step S5, in addition to the data to be transmitted.

The CPU 416 in the communication relaying device, which has received the data transmitted from the communicator 4 to the communication destination terminal 501, firstly performs a process to replace an IP address (communication identifier) of the user terminal 300 described in a part which indicates an IP address of a data transmission source in a header of the data, by the IP address of the communication relaying device.

Then, the CPU 416 in the communication relaying device transmits a command to the communicator 414, and replaces the IP address of the communication relaying device described in a part which indicates an IP address of a data destination in the header of the data, by the IP address received together with the data, in other words, the IP address "20.20.20.20" of the communication destination terminal 501, thereby making the communicator 414 transmit the data to the communication destination terminal 501.

In this way, the data is transmitted from the user terminal 300 to the communication destination terminal 501 through any one of the communication relaying devices. Further, at this time, the IP address of the communication relaying device is known from the received data at the communication destination device 501, but the IP address of the user terminal 300 which is the data transmission source is not known.

Thus, the IP address of the user terminal 300 which is the data transmission source is prevented from being disclosed to the communication destination terminal 501.

Further, the communication destination terminal 501 can find out the attribute of the user who is the data transmission source, as far as can be known from the IP address of the communication relaying device which has relayed the data.

Note that in FIG. 5, the processes are repeated from Step S1, after Step S3, after Step S6, and when it is determined that the operation to transmit the data to the communication destination terminal 501 has not been performed on the operational unit 1 at Step S4.

According to the first exemplary embodiment as mentioned above, the user terminal 300 includes the controller 2 operating as the communication relaying device selecting means which selects the communication relaying device corresponding to the disclosure level designated as the disclosure level on the attribute of the user from among disclosure levels in multiple steps, among the plurality of communication relaying devices 401 to 403 capable of relaying communication to the communication destination terminal 501, and the communicator 4 as the communication means which communicates to the communication destination terminal 501 through the communication relaying device selected by the controller 2. Therefore, it is possible to perform communication while configuring the disclosure level on the attribute of the user to be disclosed to the communication destination to the designated disclosure level.

Thus, the attribute of the user itself which the user does not want to disclose to the communication destination can be concealed from the communication destination.

That is, the user terminal 300 does not directly communicate with the communication destination terminal 501. This makes it possible to prevent the user of the communication destination terminal 501 from knowing the IP address of the user terminal 300. Thus, it is possible to prevent a problem that the attribute of the user is guessed in more detail than necessary from the IP address of the user terminal 300.

Specifically, when the disclosure level is configured to "Non-disclosure" for example, it is possible to transmit the data without disclosing the attribute of the user at all. Further, when the disclosure level is configured to "Company", it is possible to transmit the data without disclosing which department the user belongs to, while disclosing which company the user belongs to. Furthermore, when the disclosure level is configured to "Department", it is possible to transmit the data while disclosing which company the user belongs to.

Further, the disclosure level on the attribute of the user which is guessed by the communication destination from the communication identifier can be controlled by designating the disclosure level.

[Second Exemplary Embodiment]

In the above-mentioned first exemplary embodiment, the example where the data is transmitted from the user terminal 300 to the communication destination terminal 501 at the disclosure level configured at the user terminal 300 has been described. However, in this case, when access control is performed at the communication destination terminal 501, a reception of the data may be refused at the communication destination terminal 501.

In a second exemplary embodiment, an example is described where operation to retransmit the data by configuring a lower disclosure level (a higher disclosure degree) can be easily performed at the user terminal 300 when the reception of the data is refused at the communication destination terminal 501.

In a case of this exemplary embodiment, the communication destination terminal 501 notifies, upon refusing to receive the data, a refusal notification indicating the refusal of the reception of the data, to the user terminal 300, which is the data transmission source, through the communication relaying device having relayed the data.

Then, in the user terminal 300 having received this refusal notification, the operation to retransmit the data by configuring a lower disclosure level can be easily performed as described in detail bellow.

Figure 6:
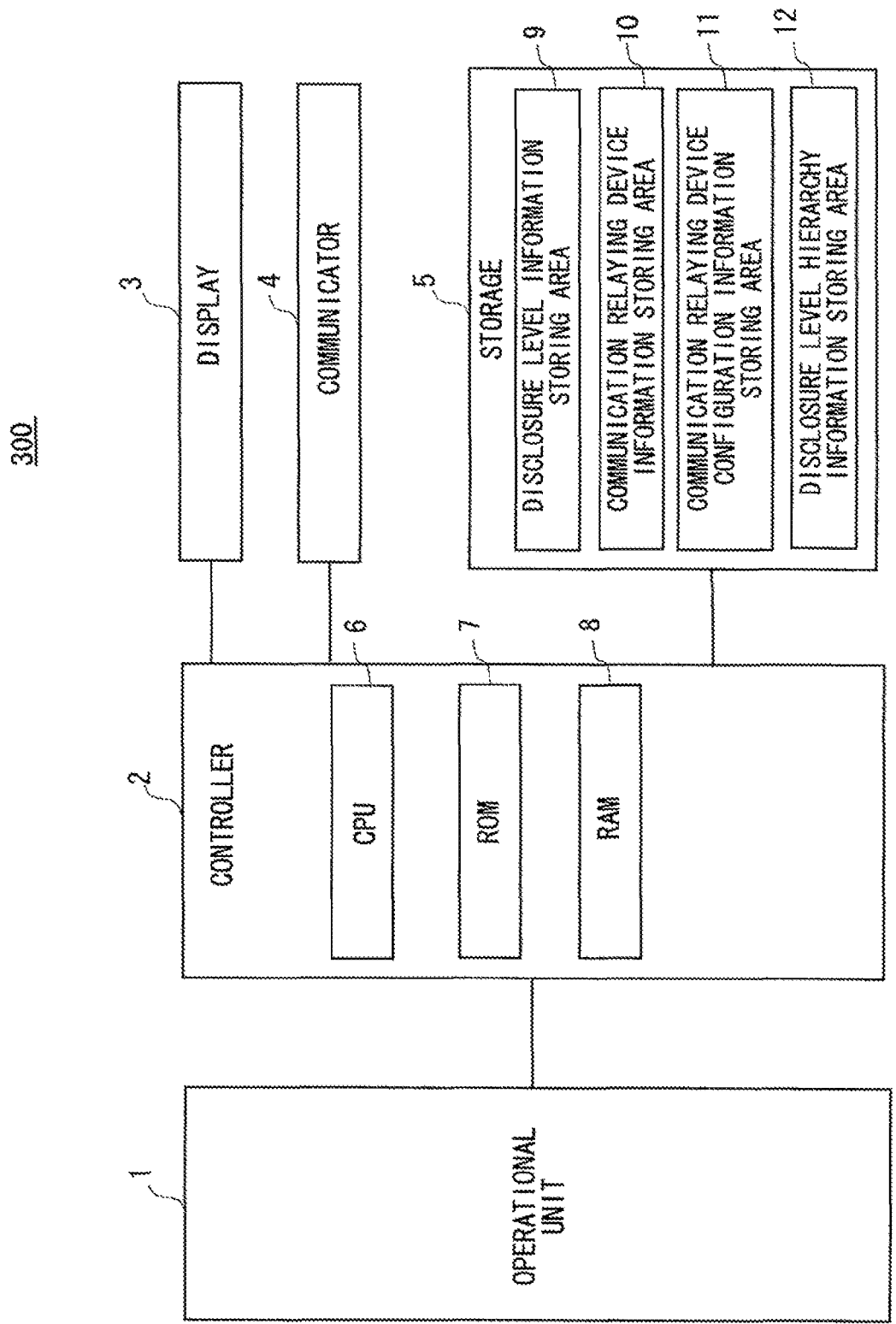
FIG. 6 is a block diagram showing a configuration of a user terminal in a case of a second exemplary embodiment.

FIG. 6 is a block diagram showing a configuration of the user terminal 300 in the case of the second exemplary embodiment.

As shown in FIG. 6, the user terminal 300 in the case of this exemplary embodiment is different from the above-mentioned first exemplary embodiment in that the storage 5 includes a disclosure level hierarchy information storing area 12.

FIG. 7 is a diagram showing an example of disclosure level hierarchy information stored in the disclosure level hierarchy information storing area 12.

As shown in FIG. 7, in the disclosure level hierarchy information storing area 12, each disclosure level is stored in association with a one-step lower disclosure level (with a one-step higher disclosure degree) than each disclosure level.

As mentioned above, the disclosure levels are hierarchical. As shown in FIG. 7, a one-step lower disclosure level than "Non-disclosure" is "Company", and a one-step lower disclosure level than "Company" is "Department".

Note that in this exemplary embodiment, the disclosure levels are three steps of "Non-disclosure", "Company", and "Department", and a disclosure level lower than "Department" does not exist. Therefore, the communication destination terminal 501 does not transmit the refusal notification, upon receiving the data from the third communication relaying device 403.

Figure 8:
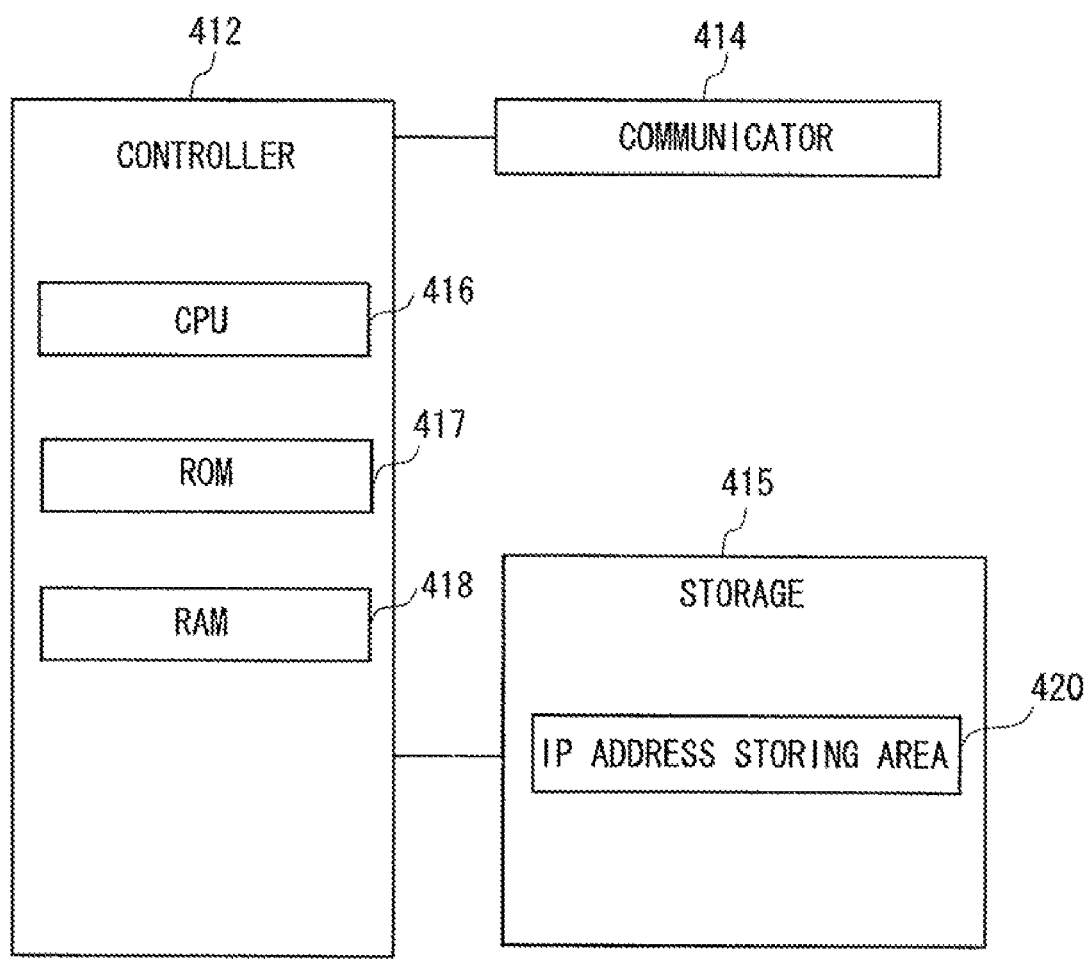
FIG. 8 is a block diagram showing a configuration of a communication relaying device in the case of the second exemplary embodiment.

FIG. 8 is a block diagram showing a configuration of each of the communication relaying devices 401 to 403 in the case of the second exemplary embodiment.

As shown in FIG. 8, each of the communication relaying devices 401 to 403 in the case of this exemplary embodiment is different from the above-mentioned first exemplary embodiment in including a storage 415 which stores data.

The storage 415 includes an IP address storing area 420 in which the IP address of the user terminal 300 which is the data transmission source is stored in association with the IP address of the communication destination terminal 501 which is the data destination.

Figure 9:
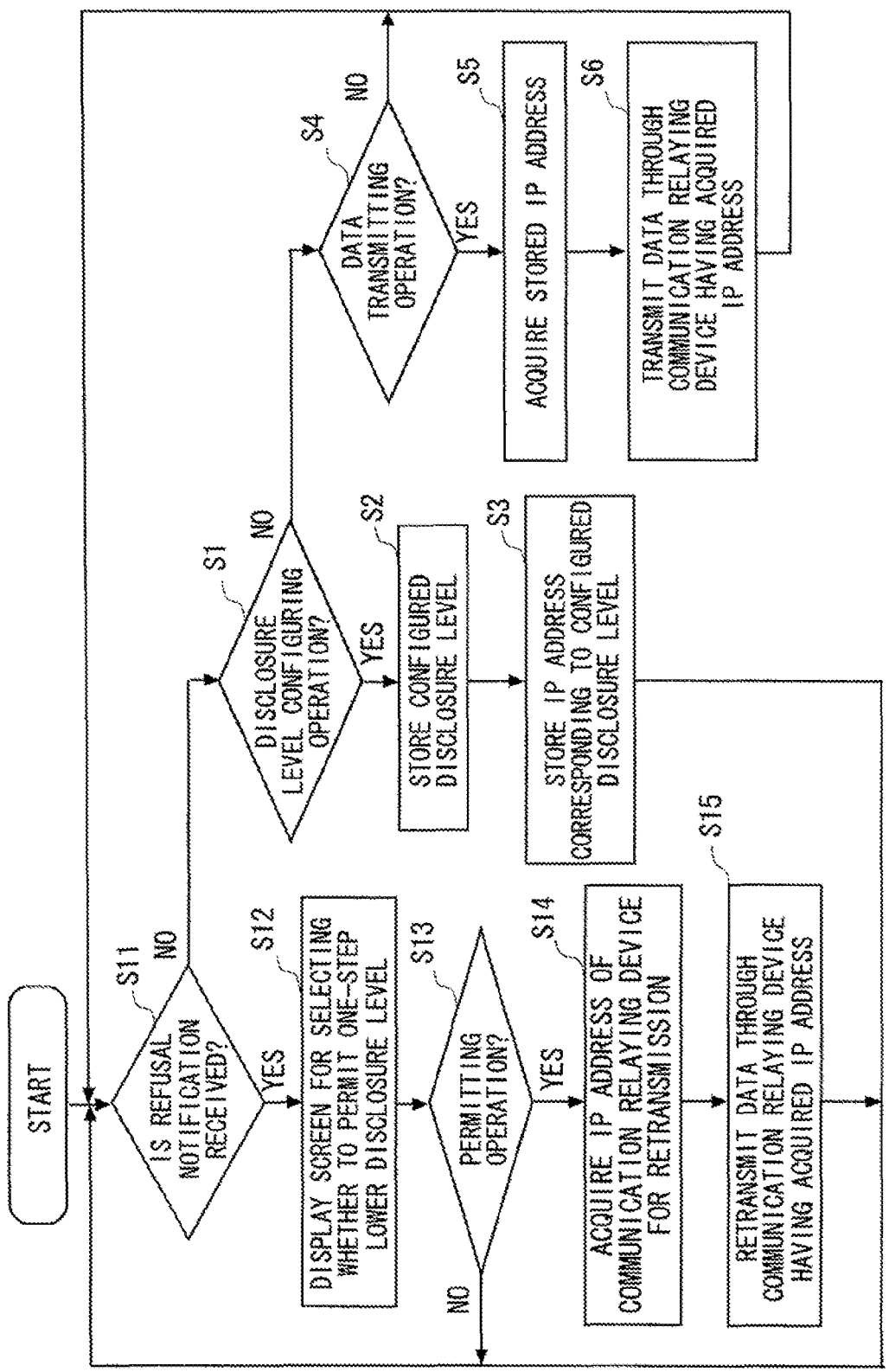
FIG. 9 is a flowchart showing operation of a user terminal in the case of the second exemplary embodiment.

FIG. 9 is a flowchart showing a flow of operation of the user terminal 300 in the case of the second exemplary embodiment.

Specifically, a case where access control by which the data cannot be received unless the disclosure level is "Company" (or "Department") is set in the communication destination terminal 501, is described in detail bellow as an example.

In this case, assume that at first, data is transmitted from the user terminal 300 to the communication destination terminal 501 through the first communication relaying device 401, while configuring the disclosure level to "Non-disclosure". Operation of the user terminal 300 upon this transmission is similar to that in the above-mentioned first exemplary embodiment. However, in the case of this exemplary embodiment, the CPU 416 in the first communication relaying device 401 stores the IP address of the user terminal 300 which is the data transmission source in the IP address storing area 420 in association with the IP address of the communication destination terminal 501 which is the data transmission destination, upon relaying the data transmission from the user terminal 300, and then controls the communicator 414 to transmit the data to the communication destination terminal 501 as with the above-mentioned first exemplary embodiment.

Further, the communication destination terminal 501, to which the data is transmitted, does not accept the data transmission from the user being in "Non-disclosure", and thus transmits a refusal notification indicating non-acceptance of the data transmission to the first communication relaying device 401.

The first communication relaying device 401, which has received the refusal notification, transfers the refusal notification to the user terminal 300 which is the data transmission source.

That is, the CPU 416 in the first communication relaying device 401 having received the refusal notification refers to the IP address storing area 420 to acquire an IP address corresponding to the IP address of the communication destination terminal 501, in other words, the IP address of the user terminal 300, and controls the communicator 411 to transmit the refusal notification to the user terminal 300 by using the acquired IP address.

On the other hand, the CPU 6 in the controller 2 monitors whether or not the communicator 4 receives the refusal notification (Step S11 in FIG. 9).

When the communicator 4 has received the refusal notification from the first communication relaying device 401 (Yes at Step S11), the CPU 6 makes the display 3 display a selection screen which prompts the user to select whether or not to permit data transmission at a one-step lower disclosure level (a disclosure level with a one-step higher disclosure degree) (Step S12), and monitors the user operation (Step S13). That is, the controller 2 operates as a disclosure degree enhancement inquiring means.

When the user performs operation to permit the data transmission at the one-step lower disclosure level on the operational unit 1, the CPU 6 detects the operation (Yes at Step S13).

Then, the CPU 6 performs a process to acquire an IP address of a communication relaying device for retransmission of the data.

That is, the CPU 6 firstly determines, based on the IP address of the communication relaying device having transferred the refusal notification at the preceding Step S11, a disclosure level corresponding to the communication relaying device. At the preceding Step S11, the first communication relaying device 400 has transferred the refusal notification. Therefore, the CPU 6 refers to the correspondence table (FIG. 4) stored in the communication relaying device information storing area 10 to determine a disclosure level corresponding to the IP address "1.1.1.1". As shown in FIG. 4, the disclosure level corresponding to the IP address "1.1.1.1" is "Non-disclosure", and thus the CPU 6 recognizes it.

Then, the CPU 6 refers to the correspondence table (FIG. 7) stored in the disclosure level hierarchy information storing area 12 to determine a one-step lower disclosure level than "Non-disclosure". As shown in FIG. 7, the one-step lower disclosure level than "Non-disclosure" is "Company", and thus the CPU 6 recognizes it.

Then, the CPU 6 again refers to the correspondence table (FIG. 4) stored in the communication relaying device information storing area 10 to determine an IP address corresponding to the disclosure level "Company". As shown in FIG. 4, the IP address corresponding to the disclosure level "Company" is "2.2.2.2", and thus the CPU 6 recognizes it.

In this way, the CPU 6 acquires the IP address "2.2.2.2" of the communication relaying device for the retransmission of the data (hereinbefore, Step S14).

That is, the CPU 6 acquires the IP address of the communication relaying device corresponding to the one-step lower disclosure level than that of the communication relaying device which is the transfer source of the refusal notification, by referring to the correspondence table (FIG. 4) stored in the communication relaying device information storing area 10 and the correspondence table (FIG. 7) stored in the IP address storing area 12 for the retransmission.

Then, the CPU 6 outputs a command to the communicator 4, thereby making the communicator 4 retransmit the data to the communication destination terminal 501 through the communication relaying device (that is, second communication relaying device 402, for example) having the IP address acquired at the preceding Step S14 (Step S15).

That is, the communicator 4, which has received the command from the CPU 6, uses the IP address "2.2.2.2" acquired by the CPU 6 at the preceding Step S14, and transmits the data to the second communication relaying device 402 which is the one having the IP address.

Upon this data transmission, the communicator 4 also transmits the IP address "20.20.20.20" of the communication destination terminal 501 to the second communication relaying device 402 which is the one having the IP address acquired at the preceding Step S5, in addition to the data to be transmitted.

The second communication relaying device 402, which has received the data transmitted from the communicator 4 to the communication destination terminal 501, transmits the received data to the communication destination terminal 501 by using the IP address received together with the data, in other words, the IP address "20.20.20.20" of the communication destination terminal 501.

In this way, the user terminal 300 can transmit the data to the communication destination terminal 501 through the second communication relaying device 402 corresponding to the disclosure level lower than that corresponding to the first communication relaying device 401 which has relayed the data at first.

Thus, the attribute of the user can be known at the disclosure level "Company" in the communication destination terminal 501, so that the access of the data transmitted from the user terminal 300 is prevented from being refused due to the access control in the communication destination terminal 501.

Note that in FIG. 9, the processes are repeated from Step S11 after Step S15.

Further, when the user performs operation not to permit the data transmission at the one-step lower disclosure level and the CPU 6 detects the operation upon the determination at Step S13 (No at Step S13), the processes are repeated from Step S11. That is, in this case, the retransmission of the data is not performed.

Furthermore, when the communicator 4 has not received the refusal notification (No at Step S11), the process moves to Step S1.

Processes at Steps S1 to S6 are similar to those in the above-mentioned first exemplary embodiment, and thus its description is omitted. However, in this exemplary embodiment, the processes are repeated from Step S11, after Step S3, after Step S6, and when it is determined that the operation to transmit the data to the communication destination terminal 501 has not been performed on the operational unit 1 at Step S4 (No at Step S4).

Note that the example where the transfer source of the refusal notification is the first communication relaying device 401 has been described above. However, when the transfer source of the refusal notification is the second communication relaying device 402, the CPU 6 can recognize that a disclosure level which corresponds to the IP address "2.2.2.2" of the transfer source is "Company" as shown in FIG. 4, and then can recognize that a one-step lower disclosure level than "Company" is "Department" as shown in FIG. 7, and thus can recognize that an IP address which corresponds to the disclosure level "Department" is "3.3.3.3" as shown in FIG. 4 and can retransmit data by using its IP address "3.3.3.3".

According to the second exemplary embodiment as mentioned above, the operation to retransmit the data by configuring the lower disclosure level (the disclosure level with the one-step higher disclosure degree) can be easily performed at the user terminal 300, when the reception of the data is refused at the communication destination terminal 501.

[Third Exemplary Embodiment]

In the above-mentioned first exemplary embodiment, the example where the data is transmitted from the user terminal 300 to the communication destination terminal 501 at the disclosure level configured at the user terminal 300 has been described. However, in this case, it causes inconvenience when the communication relaying device which corresponds to the disclosure level configured by the user does not exist.

In a third exemplary embodiment, an example is described, where more information than the user wants is prevented from being disclosed, by configuring a disclosure level higher than the configured disclosure level (a disclosure level with a low disclosure degree) to transmit data when the communication relaying device which corresponds to the disclosure level configured by the user does not exist.

Figure 10:
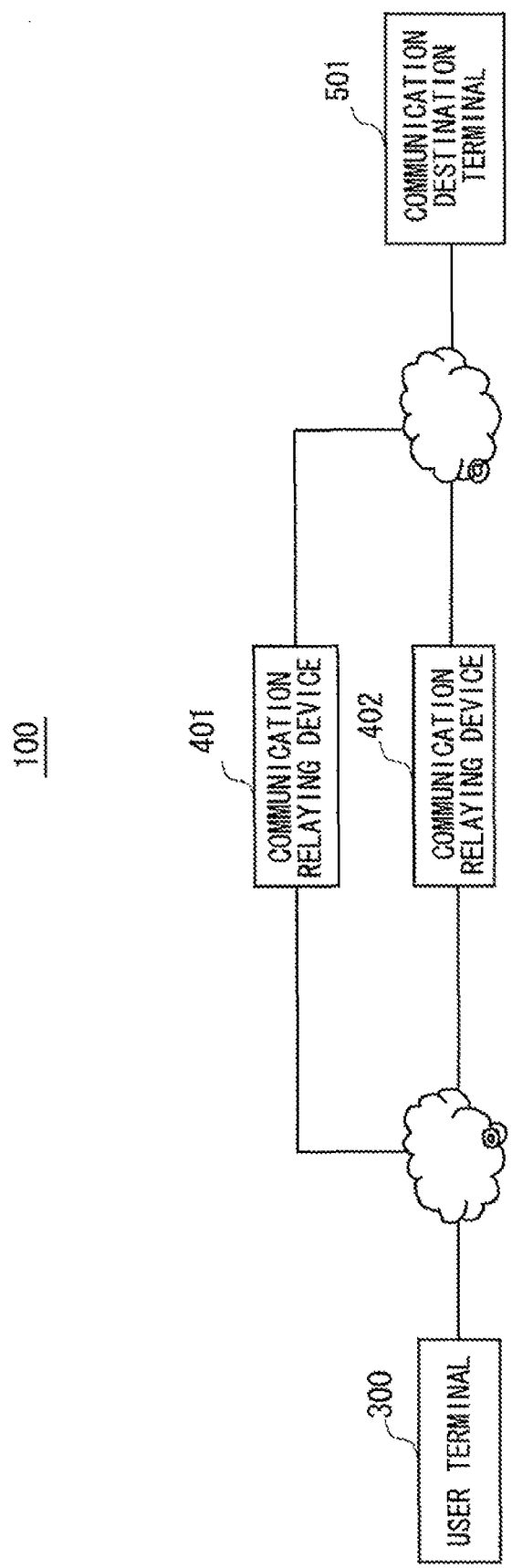
FIG. 10 is a block diagram showing a configuration of a communication system in a case of a third exemplary embodiment.

FIG. 10 is a block diagram showing a configuration of the communication system 100 in a case of the third exemplary embodiment.

As shown in FIG. 10, in the case of the third exemplary embodiment, the communication system 100 includes only the first and second communication relaying devices 401 and 402 as the communication relaying devices. In other words, the third communication relaying device 403, which is included in the communication system 100 in FIG. 1, is not included.

In the case of the third exemplary embodiment, the configuration of each of the first and second communication relaying devices 401 and 402 is similar to that in the above-mentioned first exemplary embodiment (FIG. 3).

Further, in the case of the third exemplary embodiment, the block configuration of the user terminal 300 is similar to that in the above-mentioned second exemplary embodiment (FIG. 5).

However, in the case of the third exemplary embodiment, a correspondence table which is stored in the communication relaying device information storing area 10 is different from that of the above-mentioned first and second exemplary embodiments, because the communication system 100 does not include the third communication relaying device 403.

FIG. 11 is a diagram showing the correspondence table stored in the communication relaying device information storing area 10 in the case of the third exemplary embodiment.

As shown in FIG. 11, the correspondence table stored in the communication relaying device information storing area 10 in the case of this exemplary embodiment is different from that in the above-mentioned first and second exemplary embodiments, in that the field for the third communication relaying device 403 does not exit.

Further, in the case of the third exemplary embodiment, disclosure level hierarchy information which is stored in the disclosure level hierarchy information storing area 12 is different from that of the above-mentioned second exemplary embodiment.

FIG. 12 is a diagram showing an example of the disclosure level hierarchy information stored in the disclosure level hierarchy information storing area 12 in the case of the third exemplary embodiment.

In the case of this exemplary embodiment, as shown in FIG. 12, in the disclosure level hierarchy information storing area 12, each disclosure level is stored in association with a one-step higher disclosure level (with a one-step lower disclosure degree) than each disclosure level.

As shown in FIG. 12, a one-step higher disclosure level than "Department" is "Company", and a one-step higher disclosure level than "Company" is "Non-disclosure". Note that a disclosure level higher than "Non-disclosure" does not exist.

Next, operation in the case of this exemplary embodiment is described.

Figure 13:
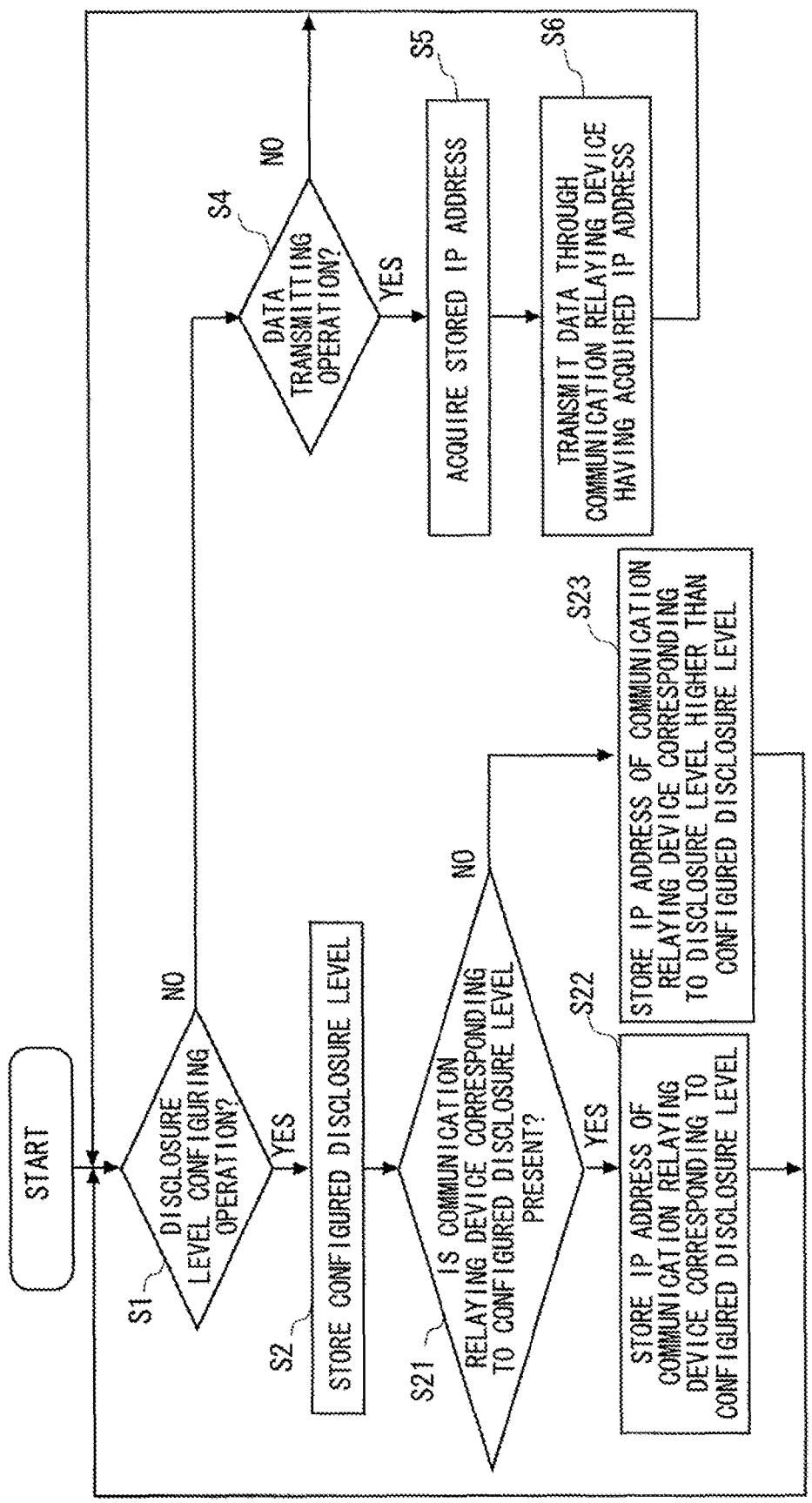
FIG. 13 is a flowchart showing a flow of operation of a user terminal in the case of the third exemplary embodiment.

FIG. 13 is a flowchart showing operation of the user terminal 300 in the case of the third exemplary embodiment.

Specifically, operation where the user transmits data after configuring the disclosure level to "Department" is described for example.

Firstly, as with the operation in the above-mentioned first exemplary embodiment, the CPU 6 in the controller 2 monitors the configuring operation of the disclosure level on the operational unit 1 (Step S1).

When the user performs the operation to configure the disclosure level on the operational unit 1, the CPU 6 in the controller 2 detects the operation (Yes at Step S1), and stores the information which indicates the disclosure level configured by the operation in the disclosure level information storing area 9 in the storage 5 (Step S2).

Specifically, assume that the user configures the disclosure level to "Department". Thus, at Step S2, the disclosure level information storing area 9 in the storage 5 stores information indicating that the configured disclosure level is "Department" therein.

Next, the CPU 6 in the controller 2 determines whether or not a communication relaying device which corresponds to the disclosure level configured by the user at the preceding Step S1 exists, by referring to the correspondence table in FIG. 11 (Step S21). That is, the controller operates as a communication relaying device existence/non-existence determining means.

Although "Department" is herein configured as the disclosure level, a communication relaying device corresponding to "Department" does not exist as shown in FIG. 11.

Therefore, the CPU 6 determines non-existence (No at Step S21).

Then, the CPU 6 acquires an IP address of a communication relaying device corresponding to a one-step higher disclosure level than the configured disclosure level, and stores the acquired IP address in the communication relaying device configuration information storing area 11 (Step S23).

That is, specifically, the CPU 6 can recognize that the one-step higher disclosure level than the disclosure level "Department" is "Company" by referring to the correspondence table in FIG. 12, and further can recognize that an IP address of a communication relaying device which corresponds to the disclosure level "Company" is "2.2.2.2" by referring to the correspondence table in FIG. 11, thereby storing the recognized IP address "2.2.2.2" in the communication relaying device configuration information storing area 11.

After Step S23, the processes are repeated from Step S1.

As the operation is performed when the data is transmitted after configuring the disclosure level to "Department", the process moves to "No" at Step S1, "Yes" at Step S4, and Step S5 in this order, after Step S23.

The CPU 6 acquires the IP address stored in the communication relaying device configuration information storing area 11 at Step S5. However, this IP address is the one (specifically, e.g. "2.2.2.2") of the communication relaying device corresponding to the one-step higher disclosure level than the disclosure level preliminarily configured by the user.

Thus, the CPU 6 then outputs a command to the communicator 4, thereby making the communicator 4 transmit the data to the communication destination terminal 501 through the second communication relaying device 402 which has the IP address "2.2.2.2" acquired at the preceding Step S5 (Step S6).

That is, the communicator 4, which has received the command from the CPU 6, uses the IP address "2.2.2.2" acquired by the CPU 6 at the preceding Step S5 and transmits the data to the second communication relaying device 402 which is the one having the IP address.

Upon the data transmission at Step S6, the communicator 4 also transmits the IP address "20.20.20.20" of the communication destination terminal 501 to the second communication relaying device 402 which is the one having the IP address acquired at the preceding Step S5, in addition to the data to be transmitted.

The CPU 416 in the second communication relaying device 402, which has received the data transmitted from the communicator 4 to the communication destination terminal 501; performs the process to replace the IP address (communication identifier) of the user terminal 300 described in the part which indicates the IP address of the data transmission source in the header of the data, by the IP address of the communication relaying device 402.

Then, the CPU 416 in the communication relaying device 402 transmits a command to the communicator 414, and replaces the IP address of the communication relaying device 402 described in the part which indicates the IP address of the data destination in the header of the data, by the IP address received together with the data, in other words, the IP address "20.20.20.20" of the communication destination terminal 501, thereby making the communicator 414 transmit the data to the communication destination terminal 501.

It this way, the data is transmitted from the user terminal 300 to the communication destination terminal 501 through the second communication relaying device 402. Further, this transmission is performed at the higher disclosure level than the disclosure level configured by the user. Therefore, the attribute of the user is not known by the communication destination, more than the user wants.

Note that in the case of this exemplary embodiment, the data is transmitted at the disclosure level configured by the user, when the communication relaying device which corresponds to the disclosure level configured by the user exists.

That is, specifically, when the user configures the disclosure level to "Non-disclosure" or "Company" for example, the determination at Step 21 becomes "Yes" at subsequent Step S22, the CPU 6 stores the IP address of the communication relaying device which corresponds to the disclosure level configured by the user in the communication relaying device configuration information storing area 11, and then the processes are repeated from Step S1.

According to the third exemplary embodiment as mentioned above, even when the communication relaying device which corresponds to the disclosure level configured by the user does not exist, the communication relaying device corresponding to the disclosure level higher than the configured disclosure level is automatically searched, and the data is transmitted through the searched communication relaying device. Therefore, communication which satisfies a requirement that information is not disclosed beyond necessity can be performed.

[Fourth Exemplary Embodiment]

In the above-mentioned first exemplary embodiment, the example has been described where the operation to select the communication relaying device which corresponds to the disclosure level configured by the user, in other words, the operation to acquire the IP address corresponding to the communication relaying device which corresponds to the disclosure level configured by the user is performed within the user terminal 300. However, in a fourth exemplary embodiment, an example is described where a relaying-device selecting device which performs this operation is provided outside the user terminal 300.

Figure 14:
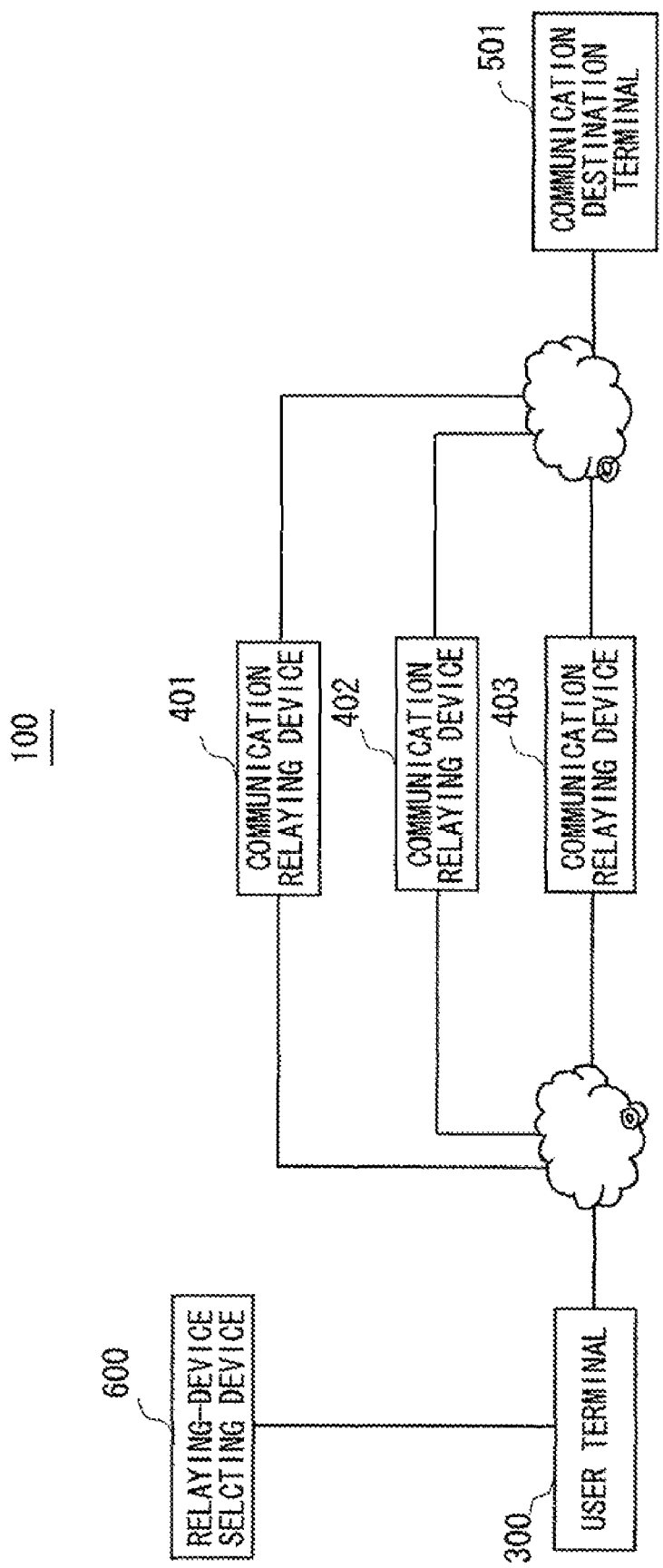
FIG. 14 is a block diagram showing a configuration of a communication system in a case of a fourth exemplary embodiment.

FIG. 14 is a block diagram showing a configuration of the communication system 100 in a case of the fourth exemplary embodiment.

As shown in FIG. 14, the communication system 100 in the case of the fourth exemplary embodiment is different from that in the case of the above-mentioned first exemplary embodiment, in including a relaying-device selecting device 600.

Figure 15:
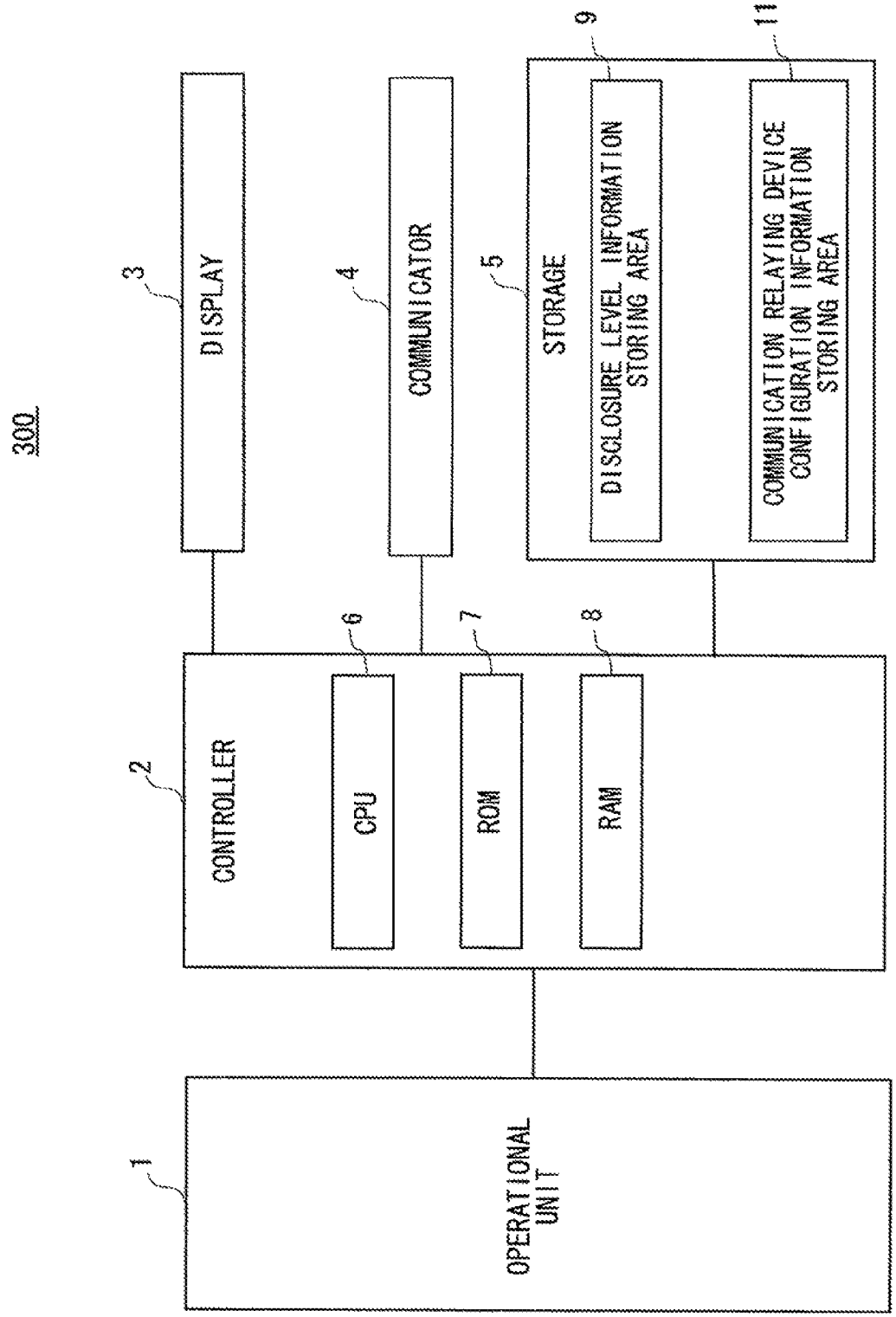
FIG. 15 is a block diagram showing a configuration of a user terminal in the case of the fourth exemplary embodiment.

FIG. 15 is a block diagram showing a configuration of the user terminal 300 in the case of the fourth exemplary embodiment.

As shown in FIG. 15, the user terminal 300 in the case of the fourth exemplary embodiment is different from that in the case of the above-mentioned first exemplary embodiment, in that the storage 5 does not include the communication relaying device information storing area 10.

Figure 16:
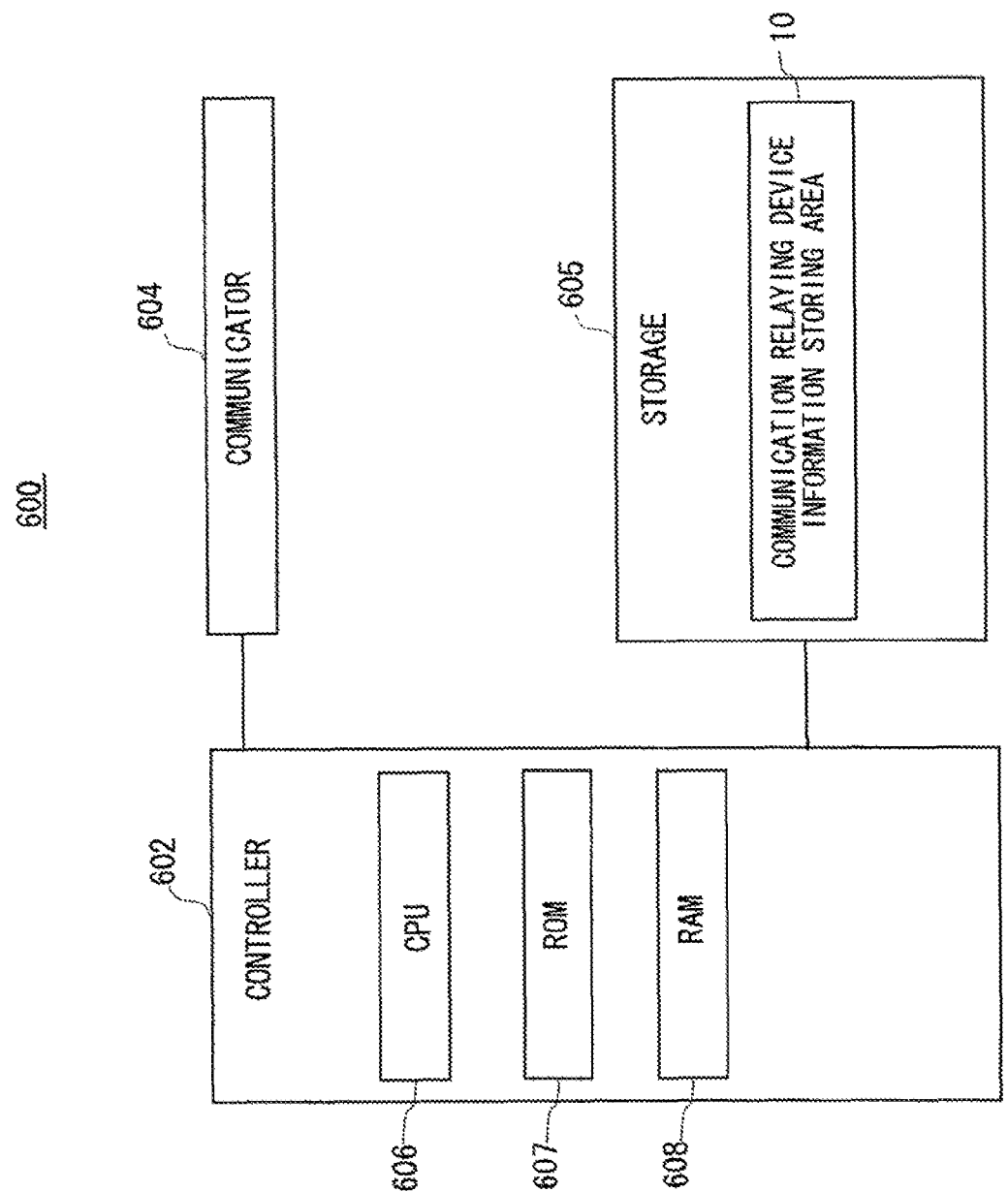
FIG. 16 is a block diagram showing a configuration of a relaying-device selecting device.

FIG. 16 is a block diagram showing a configuration of the relaying-device selecting device 600.

As shown in FIG. 16, the relaying-device selecting device 600 includes a controller 602, a communicator 604 which performs communication between the user terminal 300 and the communication relaying devices 401 to 403, and a storage 605 which stores data.

The controller 602 includes a CPU 606 which performs various control actions, a ROM 607 which stores a program for the actions of the CPU 606 or the like, and a RAM 608 which operates as a work area of the CPU 606 or the like.

The control actions by the CPU 606 in the controller 602 include communication control to make the communicator 604 perform the communication.

The storage 605 includes the communication relaying device information storing area 10. This communication relaying device information storing area 10 is similar to that in the above-mentioned first exemplary embodiment, and stores and holds, for example, the correspondence table between the IP address as the communication identifier of each of the communication relaying devices 401 to 403 and the disclosure level as shown in FIG. 4.

Next, operation is described.

Figure 17:
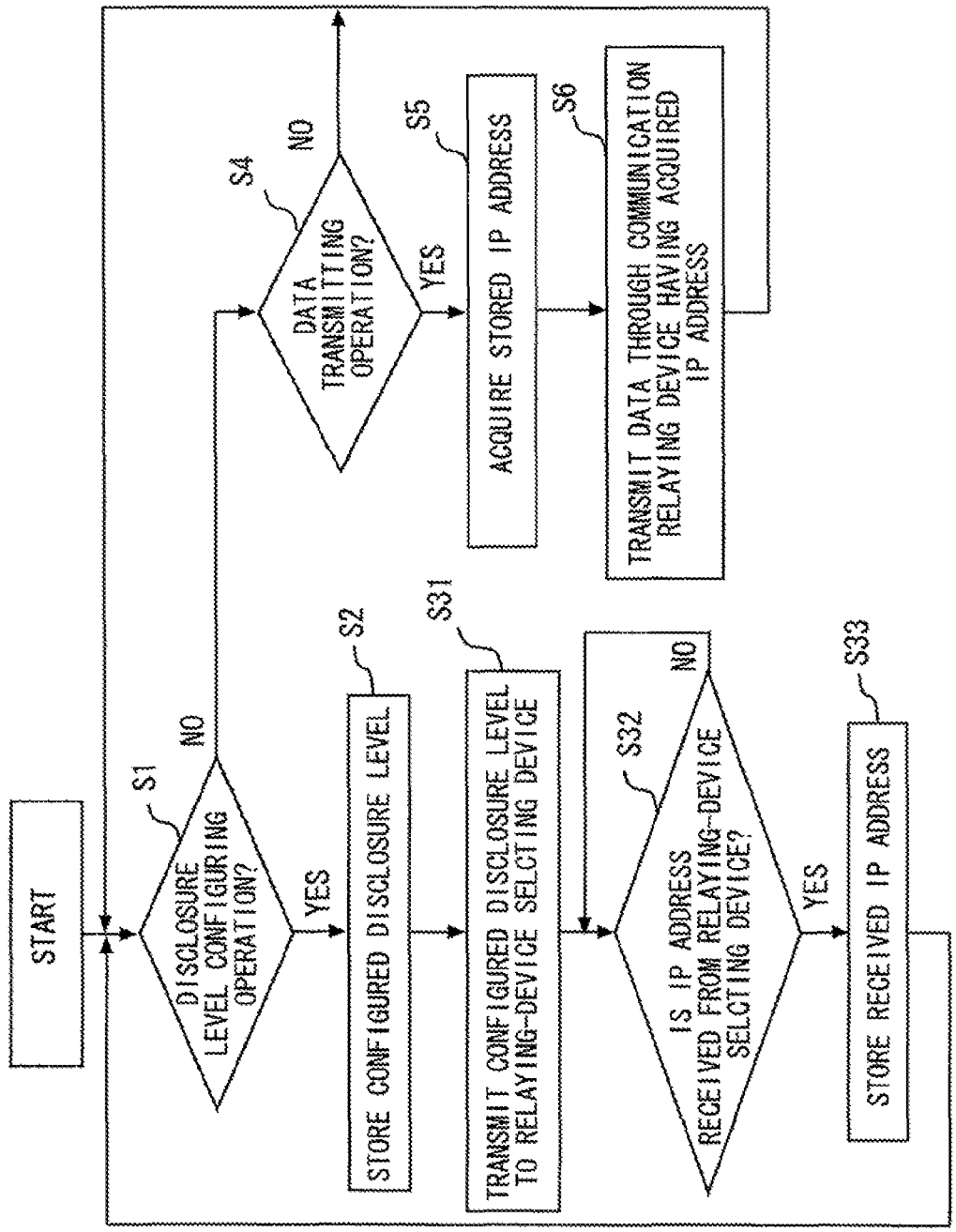
FIG. 17 is a flowchart showing a flow of operation of a user terminal in the case of the fourth exemplary embodiment.
Figure 18:
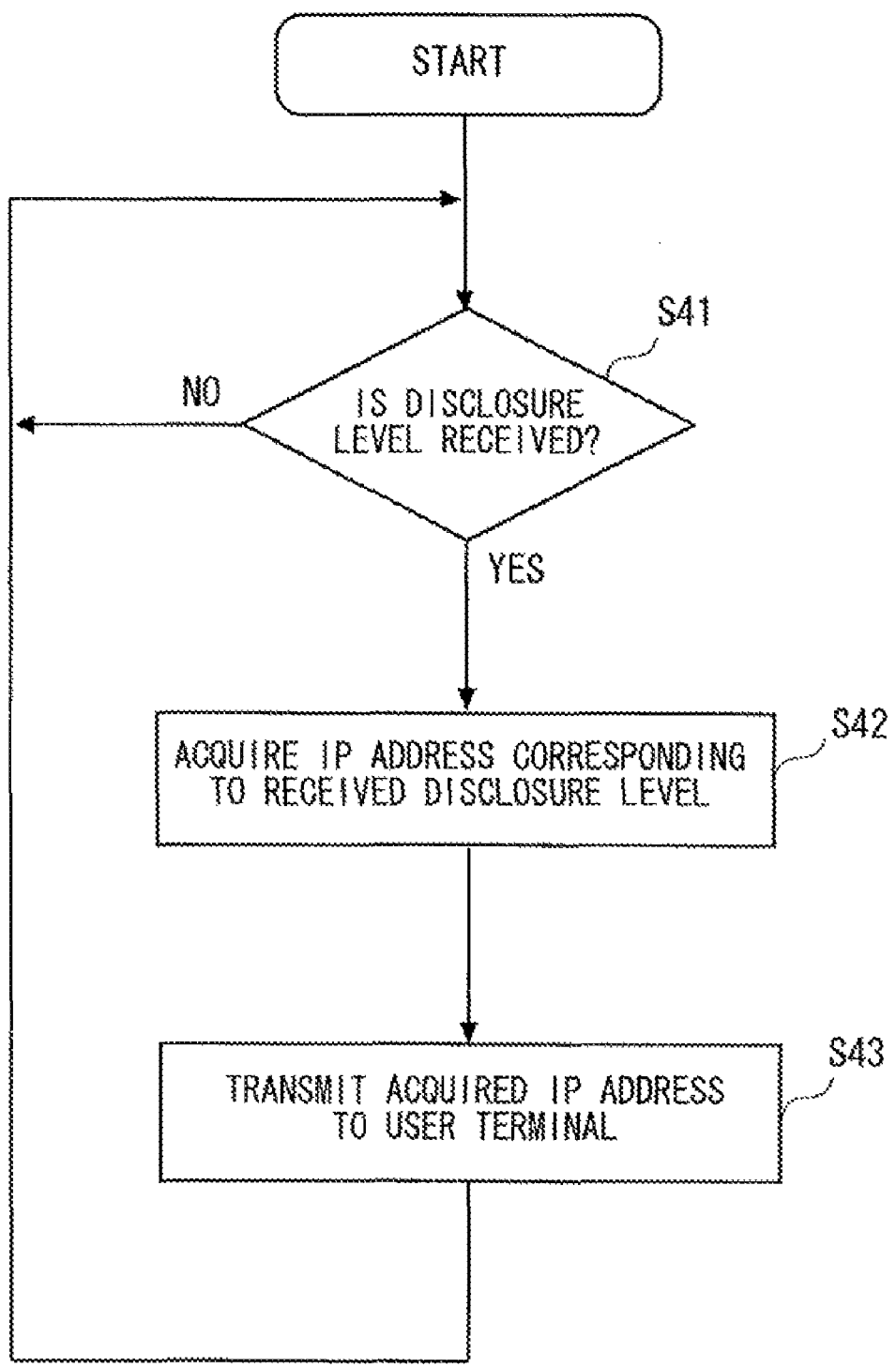
FIG. 18 is a flowchart showing a flow of operation of a relaying-device selecting device.

FIG. 17 is a flowchart showing operation of the user terminal 300 and FIG. 18 is a flowchart showing operation of the relaying-device selecting device 600, in the case of the fourth exemplary embodiment.

As shown in FIG. 17, the CPU 6 in the controller 2 monitors the configuration operation of the disclosure level with respect to the operational unit 1 (Step S1).

When the user performs the operation to configure the disclosure level (any one of "Non-disclosure", "Company", and "Department") on the operational unit 1, the CPU 6 in the controller 2 detects the operation (Yes at Step S1), and stores the information indicating the disclosure level configured by the operation in the disclosure level information storing area 9 in the storage 5 (Step S2).

Then, the CPU 6 outputs a command to the communicator 4, thereby making the communicator 4 transmit the disclosure level stored in the disclosure level information storing area 9 at the preceding Step S2 to the relaying-device selecting device 600 (Step S31).

On the other hand, as shown in FIG. 18, the CPU 606 in the relaying-device selecting device 600 monitors whether or not the communicator 604 receives the disclosure level from the user terminal 300 (Step S41).

When it is received (Yes at Step S41), the CPU 606 acquires an IP address corresponding to the disclosure lever received by the communicator 604 at the preceding Step S41, by referring to the correspondence table (FIG. 4) stored in the communication relaying device information storing area 10 in the storage 605 (Step S42).

Then, the CPU 606 outputs a command to the communicator 604, thereby making the communicator 604 transmit the IP address acquired at the preceding Step S42 to the user terminal 300 (Step S43).

Further, in the user terminal 300, after the preceding Step S31, the CPU 6 monitors whether or not to receive the IP address of the communication relaying device from the relaying-device selecting device 600 (Step S32).

This monitor is repeated until the communicator 4 in the user terminal 300 receives the IP address of the communication relaying device from the relaying-device selecting device 600.

When the communicator 4 in the user terminal 300 has received the IP address of the communication relaying device from the relaying-device selecting device 600 (Yes at Step S32), the received IP address is stored in the communication relaying device configuration information storing area 11 (Step S33).

After Step S33, the processes are repeated from Step S1.

Note that operation (corresponding to Steps S4 to S6 in FIG. 17) when the user of the user terminal 300 performs operation to perform Internet access and transmit data to the communication destination terminal 501 is similar to that in the above-mentioned first exemplary embodiment, and thus its description is omitted.

According to the fourth exemplary embodiment as mentioned above, the relaying-device selecting device 600 provided outside the user terminal 300 performs the operation to acquire the IP address corresponding to the communication relaying device which corresponds to the disclosure level configured by the user. Therefore, a processing load in the user terminal 300 can be reduced.

[Modified Example of Fourth Exemplary Embodiment]

Figure 19:
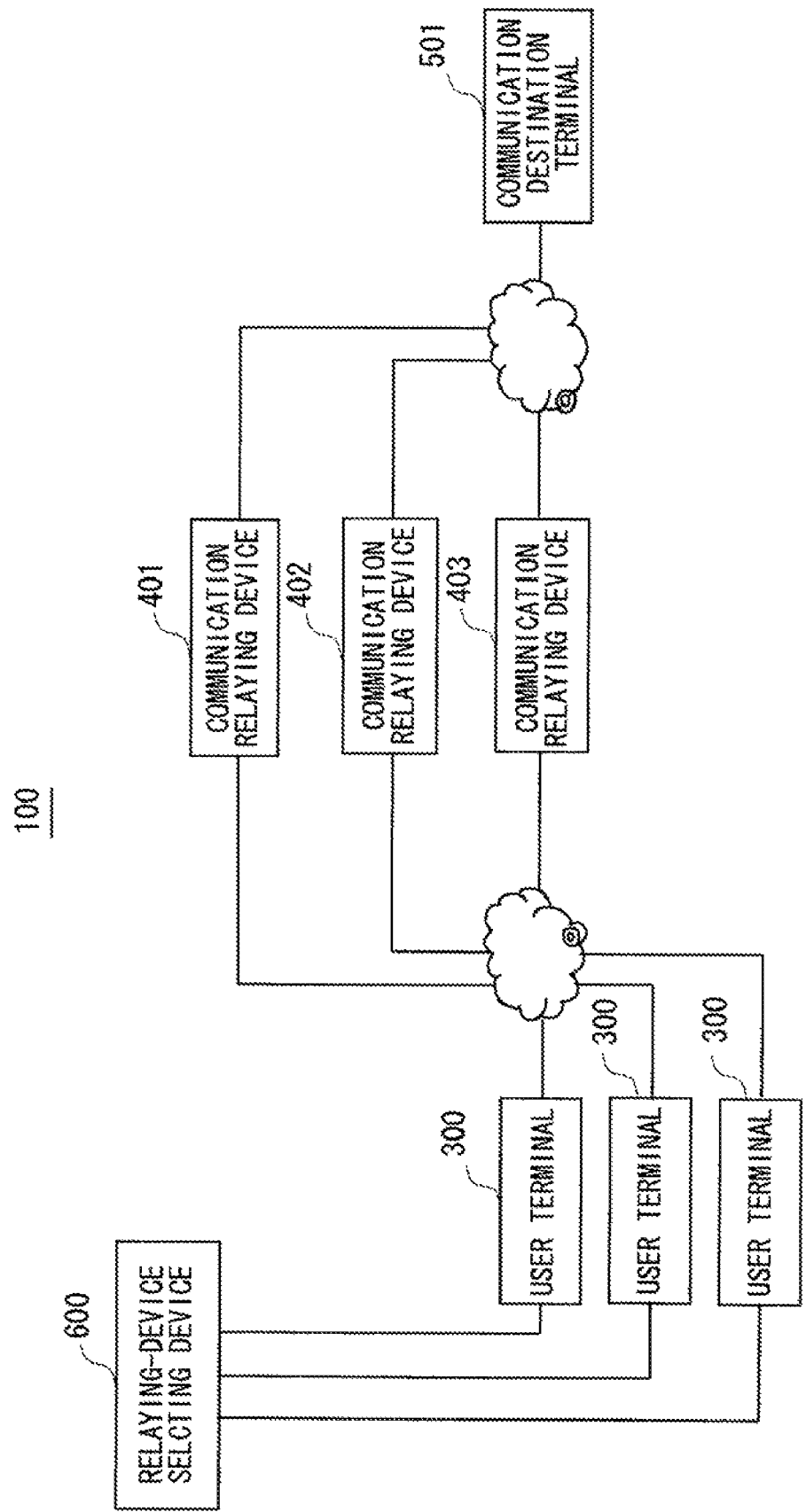
FIG. 19 is a block diagram showing a configuration of a communication system in a case of a modified example of the fourth exemplary embodiment.

In the above-mentioned fourth exemplary embodiment, the example where there is one user terminal 300 has been described. However, as shown in FIG. 19, a plurality of user terminals 300 may share the relaying-device selecting device 600.

[Fifth Exemplary Embodiment]

In the above-mentioned first exemplary embodiment, the example where the data is transmitted from the user terminal 300 to the communication destination terminal 501 at the disclosure level configured at the user terminal 300, has been described. Meanwhile, in a fifth exemplary embodiment, an example is described where the data is transmitted while changing the disclosure level in accordance with a move schedule of the user.

Figure 20:
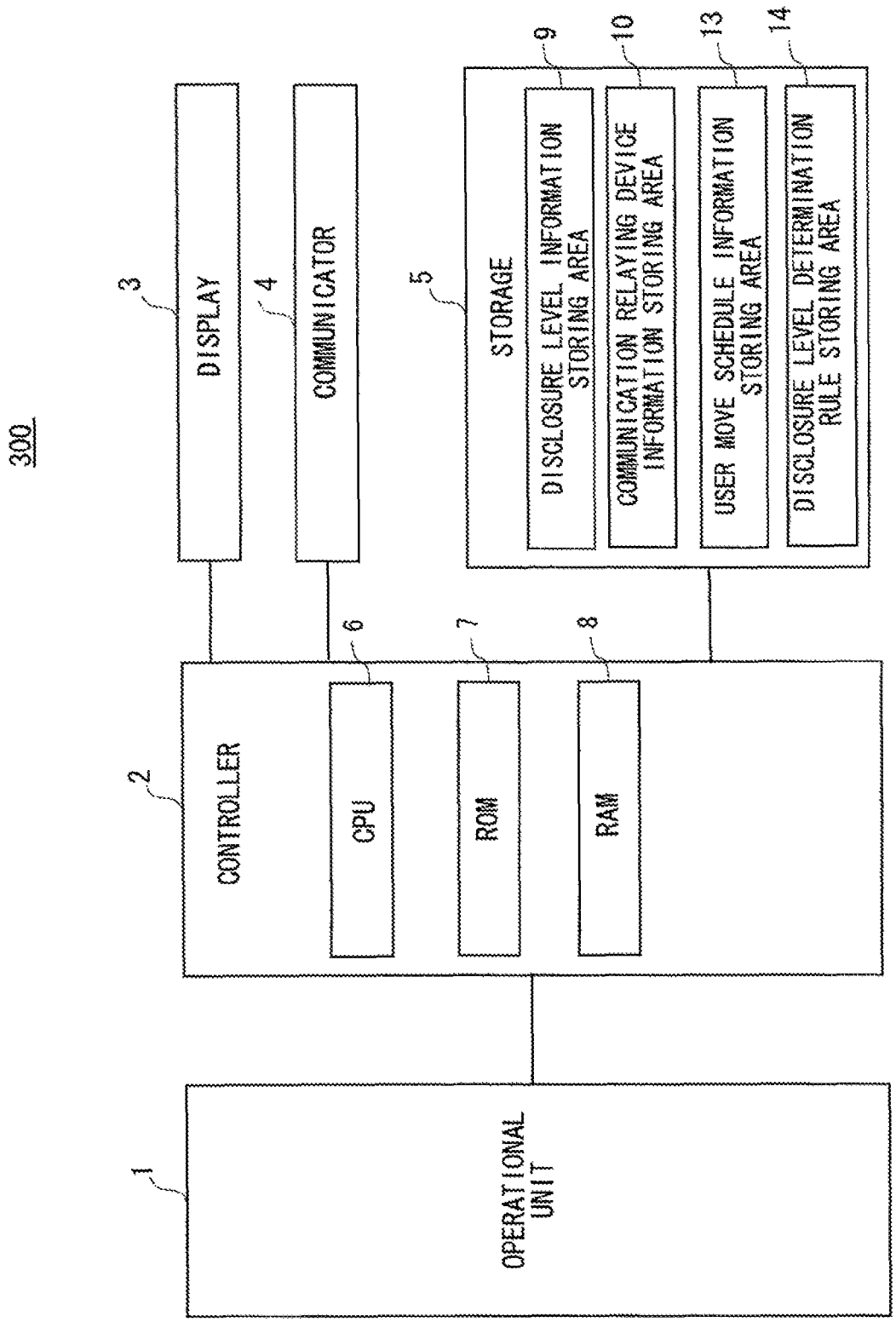
FIG. 20 is a block diagram showing a configuration of a user terminal in a case of a fifth exemplary embodiment.

FIG. 20 is a block diagram showing a configuration of the user terminal 300 in a case of the fifth exemplary embodiment.

As shown in FIG. 20, the user terminal 300 in the case of the fifth exemplary embodiment is different in that the storage 5 includes a user move schedule information storing area 13 and a disclosure level determination rule storing area 14.

The user move schedule information storing area 13 stores a user's own move schedule inputted by the user. Specifically, when the user performs operation to input a move schedule "Business trip outside company on month O-day X" on the operational unit 1, for example, the CPU 6 stores information indicating the move schedule in the user move schedule information storing area 13.

Further, the disclosure level determination rule storing area 14 preliminarily stores a determination rule for determination of the disclosure level in accordance with the move schedule. Specifically, this determination rule includes a content "Configure the disclosure level to Non-disclosure on the day of the business trip outside the company, and configure the disclosure level to the configured disclosure level on the other days", for example.

Note that in a case of this exemplary embodiment, the storage 5 may also include the communication relaying device configuration information storing area 11 as with the first exemplary embodiment. However, the communication relaying device configuration information storing area 11 may not be included, and thus the example where the communication relaying device configuration information storing area 11 is omitted is described.

Next, operation is described.

Figure 21:
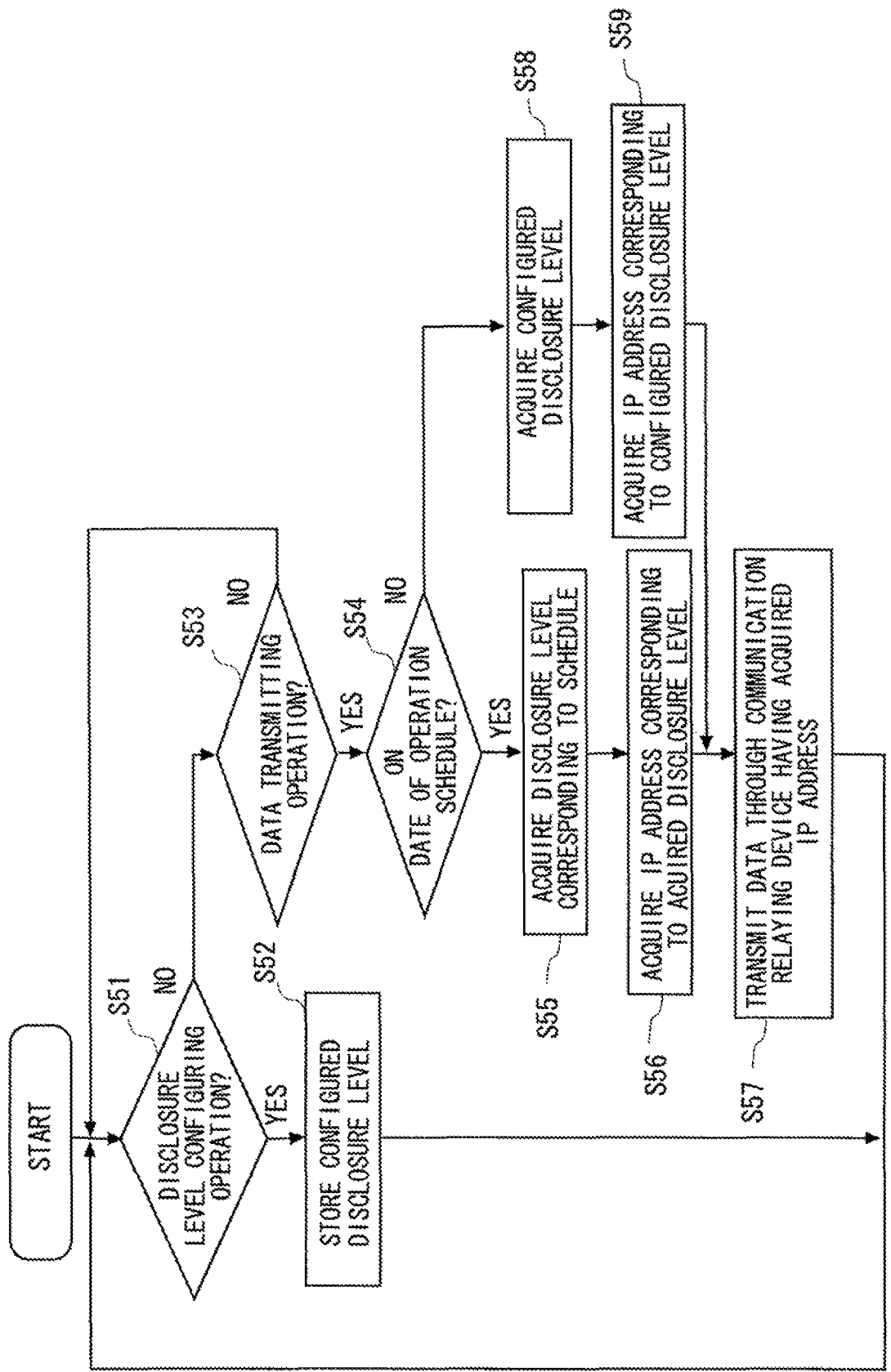
FIG. 21 is a flowchart showing a flow of operation of a user terminal in a case of a fifth exemplary embodiment.

FIG. 21 is a flowchart showing operation of the user terminal 300 in the case of the fifth exemplary embodiment.

For example, operation is described in which the user configures the disclosure level to "Department", and then the data is transmitted from the user terminal 300 to the communication destination terminal 501 on the day of the move schedule outside the company.

Firstly, the CPU 6 in the controller 2 monitors the configuration operation of the disclosure level with respect to the operational unit 1 (Step S51).

When the user performs the operation to configure the disclosure level (any one of "Non-disclosure", "Company", and "Department") on the operational unit 1, the CPU 6 in the controller 2 detects the operation (Yes at Step S51), and stores the information indicating the disclosure level configured by the operation in the disclosure level information storing area 9 in the storage 5 (Step S52).

After Step S52, the processes are repeated from Step S51.

Further, when the operation to configure the disclosure level is not detected (No at Step S51), the CPU 6 in the controller 2 monitors whether or not the operation to transmit the data to the communication destination terminal 501 is performed on the operational unit 1 (Step S53).

When the user performs the operation to transmit the data to the communication destination terminal 501 on the operational unit 1, the CPU 6 in the controller 2 detects the operation (Yes at Step S53), and the process moves to Step S54.

At step S54, the CPU 6 determines whether or not the day of the move schedule has arrived, by referring to the user move schedule information storing area 13. That is, the controller 2 herein operates as a move schedule determining means.

When the day of the move schedule has arrived, the process moves to Step S55

As the operation corresponds to one on the day of the move schedule outside the company, the process moves to Step S55 after Step S54.

At Step S55, the CPU 6 acquires a disclosure level corresponding to the move schedule, by referring to the disclosure level determination rule storing area 14.

That is, in the disclosure level determination rule storing area 14, the determination rule "Configure the disclosure level to Non-disclosure on the day of the business trip outside the company, and configure the disclosure level to the configured disclosure level on the other days" is stored. Therefore, the CPU 6 acquires "Non-disclosure" as the disclosure level.

Then, the CPU 6 acquires an IP address corresponding to the disclosure level acquired at the preceding Step S55, by referring to the correspondence table (FIG. 4) stored in the communication relaying device information storing area 10 (Step S56).

That is, the IP address "1.1.1.1" corresponding to the disclosure level "Non-disclosure" is acquired.

Then, the CPU 6 outputs a command to the communicator 4, thereby making the communicator 4 transmit the data to the communication destination terminal 501 through the first communication relaying device 401 which has the IP address "1.1.1.1" acquired at the preceding Step S56 (Step S57).

That is, the communicator 4, which has received the command from the CPU 6, uses the IP address "1.1.1.1" acquired by the CPU 6 at the preceding Step S56, and transmits the data to the first communication relaying device 401 having the IP address.

Upon the data transmission at Step S57, the communicator 4 also transmits the IP address "20.20.20.20" of the communication destination terminal 501 to the first communication relaying device 401 having the IP address acquired at the preceding Step S56, in addition to the data to be transmitted.

The CPU 416 in the first communication relaying device 401, which has received the data transmitted from the communicator 4 to the communication destination terminal 501, performs the process to replace the IP address (communication identifier) of the user terminal 300 described in the part which indicates the IP address of the data transmission source in the header of the data, by the IP address of the communication relaying device 401.

Then, the CPU 416 in the communication relaying device 401 transmits a command to the communicator 414, and replaces the IP address of the communication relaying device 401 described in the part which indicates the IP address of the data transmission destination in the header of the data, by the IP address received together with the data, in other words, the IP address "20.20.20.20" of the communication destination terminal 501, thereby making the communicator 414 transmit the data to the communication destination terminal 501.

It this way, the data is transmitted from the user terminal 300 to the communication destination terminal 501 through the first communication relaying device 401.

Note that when the user performs the operation to transmit the data to the communication destination terminal 501 on the operational unit 1 on a day other than the day of the move schedule (Yes at Step S53), the determination at subsequent Step S54 becomes "No".

In this case, at Step S58 subsequent to Step S54, the CPU 6 acquires the disclosure level configured by the user (in this example, "Department"), by referring to the disclosure level information storing area 9.

Further, at Step S59 subsequent to Step S58, the CPU 6 acquires the IP address "3.3.3.3" corresponding to the disclosure level "Department" acquired at the preceding Step S58, by referring to the correspondence table in FIG. 4.

Then, at Step S57 subsequent to Step S57, the CPU 6 outputs the command to the communicator 4, thereby making the communicator 4 transmit the data to the communication destination terminal 501 through the third communication relaying device 403 which has the IP address "3.3.3.3" acquired at the preceding Step S59.

According to the fifth exemplary embodiment as mentioned above, the disclosure level can be changed in accordance with the move schedule.

[Sixth Exemplary Embodiment]

In the above-mentioned first exemplary embodiment, the example has been described where the data is transmitted from the user terminal to the communication destination terminal at the disclosure level preliminarily configured in the user terminal. Meanwhile, in a sixth exemplary embodiment, an example is described where the user selects the disclosure level per data transmission.

In a case of this exemplary embodiment, assume that the disclosure levels are two steps of "Disclosure" and "Non-Disclosure" for simplification.

Therefore, only the first and second communication relaying devices 401 and 402 may be provided as communication relaying devices, and thus the communication system 100 in the case of this exemplary embodiment can be configured as shown FIG. 10 as with the third exemplary embodiment.

Further, the disclosure level of each of the communication relaying devices 401 and 402 can be also configured in a similar manner as that in the above-mentioned third exemplary embodiment. That is, assume that "Disclosure" in this exemplary embodiment is "Company" as with the above-mentioned third exemplary embodiment.

Thus, in the case of this exemplary embodiment, a stored content of the communication relaying device information storing area 10 in the user terminal 300 can be configured in a similar manner as that in the above-mentioned third exemplary embodiment (refer to FIG. 11).

Note that the user terminal 300 in the case of this exemplary embodiment does not need to include the disclosure level information storing area 9 and the communication relaying device configuration information storing area 11.

Figure 22:
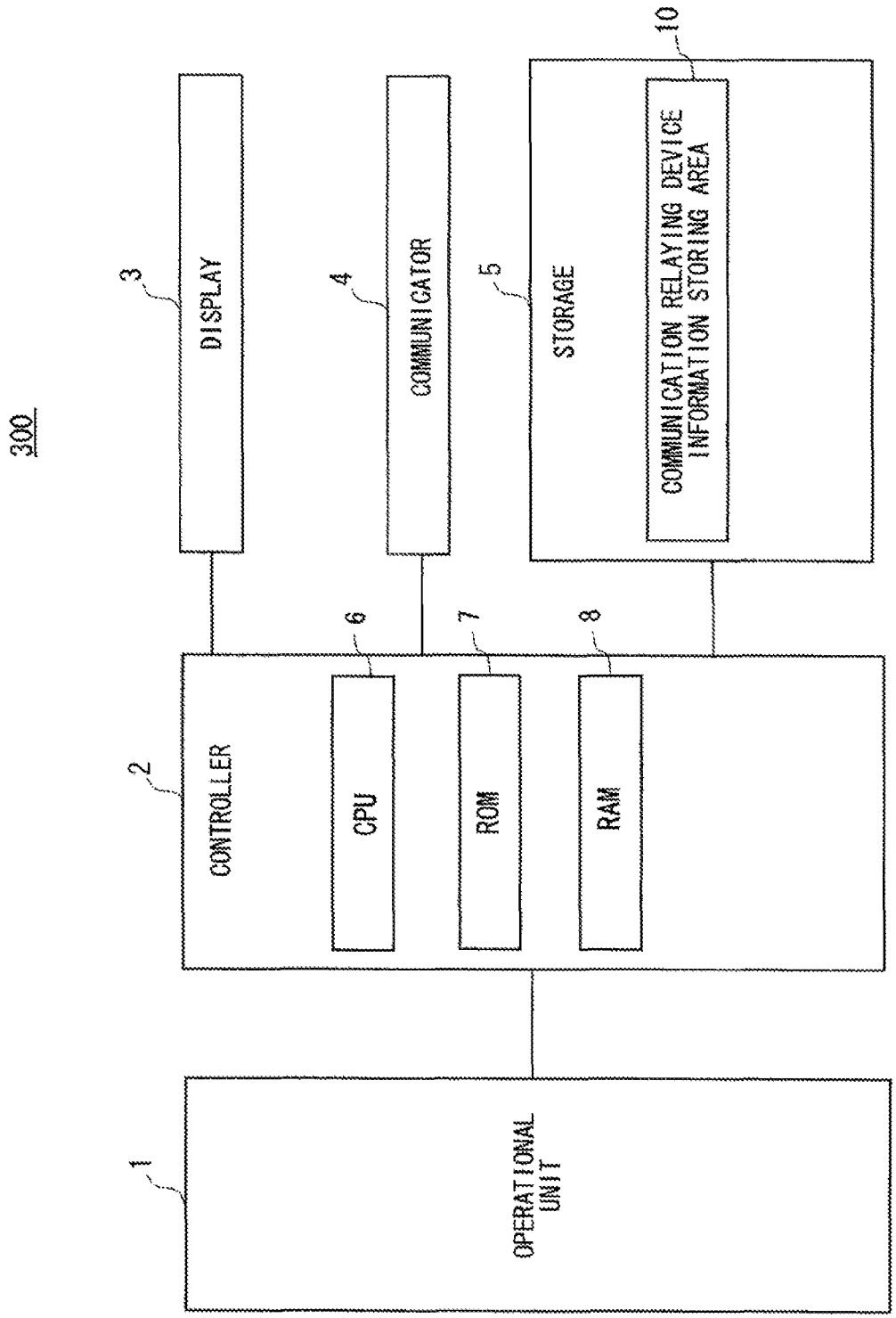
FIG. 22 is a block diagram showing a configuration of a user terminal in a case of a sixth exemplary embodiment.

Thus, the user terminal 300 in the case of this exemplary embodiment is configured as shown in FIG. 22.

Next, operation in the case of this exemplary embodiment is described.

Figure 23:
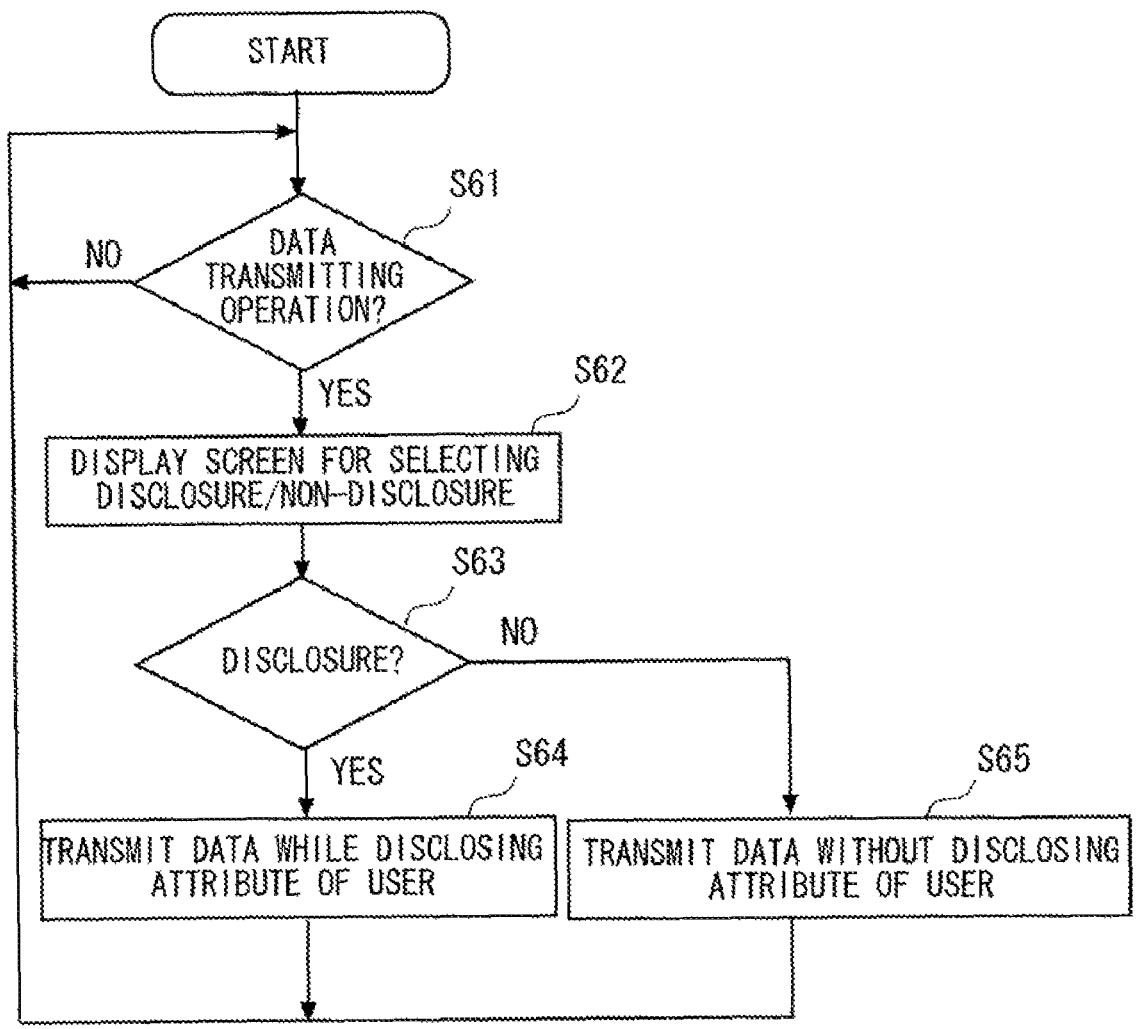
FIG. 23 is a flowchart showing a flow of operation of a user terminal in the case of the sixth exemplary embodiment.

FIG. 23 is a flowchart showing a flow of operation of the user terminal 300 in the case of this exemplary embodiment.

In the case of this exemplary embodiment, assume that the user transmits data by selecting "Disclosure (Company)" as the disclosure level upon trusting a destination of data, or selecting "Non-disclosure" as the disclosure level upon not trusting.

Firstly, the CPU 6 in the controller 2 monitors whether or not the operation to transmit the data to the communication destination terminal 501 is performed on the operational unit 1 (Step S61).

When the user performs the operation to transmit the data to the communication destination terminal 501 on the operational unit 1, the CPU 6 in the controller 2 detects the operation (Yes at Step S61), and makes the display 3 display a screen for selecting whether or not to disclose the attribute of the user (Step S62). That is, the controller 2 herein operates as a disclosure level inquiring means.

When the user performs operation to select "Disclosure" on the operational unit 1, the CPU 6 detects the operation (Yes at Step S63), acquires the IP address "2.2.2.2" corresponding to "Disclosure (Company)" by referring to the correspondence table shown in FIG. 11, and transmits the data to the communication destination terminal 501 through the second communication relaying device 402 corresponding to the acquired IP address (Step S64).

On the other hand, when the user performs operation to select "Non-disclosure" on the operational unit 1, the CPU 6 detects the operation (No at Step S63), acquires the IP address "1.1.1.1" corresponding to "Non-disclosure" by referring to the correspondence table shown in FIG. 11, and transmits the data to the communication destination terminal 501 through the first communication relaying device 401 corresponding to the acquired IP address (Step S65).

According to the sixth exemplary embodiment as mentioned above, communication can be performed at the disclosure level selected per communication, not at the disclosure level preliminarily configured.

Note that in each of the above-mentioned exemplary embodiments, the example has been described where the user terminal 300 performs the Internet access and the data transmission to the communication destination terminal 501, and the example where the IP address is used as the communication identifier has been described. The present invention is not limited to these examples, and can be also applied to a case where communication is performed by using SIP (Session Initiation Protocol) from the user terminal 300 to the communication destination terminal 501, in a similar way. In this case, the IP address in the description of each of the above-mentioned exemplary embodiments may be replaced by an SIP-URI (as the communication identifier, the SIP-URI is used). Further, the present invention can be also applied to a case where E-mail communication is performed from the user terminal 300 to the communication destination terminal 501, in a similar way. In this case, the IP address in the description of each of the above-mentioned exemplary embodiments may be replaced by an E-mail address (as the communication identifier, the E-mail address is used). Furthermore, when the SIP-URI or the E-mail address is used as the communication identifier, an SIP address or an E-mail of the user terminal 300 can be recorded as a history in the header of the data. Therefore, the CPU 416 in the controller 412 in each of the communication relaying devices 401 to 403 performs a process to delete the SIP address or the E-mail of the user terminal stored as the history in the header, upon relaying the data transmission from the user terminal 300 to the communication destination terminal 501.

Further, in each of the above-mentioned exemplary embodiments, the example has been described where only the data transmission from the user terminal 300 which is the data transmission source to the communication destination terminal 501 is performed through the communication relaying device. However, data transmission from the communication destination terminal 501 which is the communication destination to the user terminal 300 may be similarly performed through another communication relaying device.

Furthermore, in each of the above-mentioned exemplary embodiments, the example has been described where the data transmission from the user terminal 300 which is the data transmission source to the communication destination terminal 501 is relayed by a single communication relaying device. However, a plurality of communication relaying devices may sequentially relay. In the latter case, the disclosure level depends on a communication relaying device that lastly relays.

Note that as examples of the user terminal 300 include a computer communication device, a mobile terminal, and an IP phone.

Industrial Applicability

The present invention is applicable to a communication system, and particularly to a communication system which conceals a communication identifier used for communication by a user from a communication destination.

The invention claimed is:

1. A communication terminal device comprising:
a communication relaying device selecting unit that selects a communication relaying device corresponding to a disclosure level designated as a disclosure level on an attribute of a user from among disclosure levels in multiple steps, among a plurality of communication relaying devices capable of relaying communication to a communication destination terminal; and
a communication unit that communicates to the communication destination terminal through the communication relaying device selected by the communication relaying device selecting unit,
wherein an attribute of the user disclosed to the communication destination terminal at each disclosure level includes an attribute of the user disclosed at a disclosure level with a lower disclosure degree than each disclosure level.

2. The communication terminal device according to claim 1, further comprising a communication relaying device information storing unit that stores a communication identifier allocated to each of the plurality of communication relaying devices in association with the disclosure level in each step,
wherein the communication relaying device selecting unit performs the selection of the communication relaying device, by referring to a stored content of the communication relaying device information storing unit to acquire a communication identifier corresponding to the designated disclosure level, and
wherein the communication unit performs the communication to the communication destination terminal through a communication relaying device having the communication identifier acquired by the communication relaying device selecting unit.

3. The communication terminal device according to claim 2, further comprising a communication relaying device identifier storing unit that stores and holds the communication identifier acquired by the communication relaying device selecting unit,
wherein the communication unit performs the communication to the communication destination terminal through a communication relaying device having the communication identifier stored in the communication relaying device identifier storing unit.

4. The communication terminal device according to claim 1, further comprising:

an operational unit that accepts user operation; and
a disclosure level storing unit that stores and holds a disclosure level designated by operation for the operational unit,
wherein the communication relaying device selecting unit selects a communication relaying device in accordance with the disclosure level stored in the disclosure level storing unit.

5. The communication terminal device according to claim 3, further comprising:
an operational unit that accepts user operation; and
a disclosure level storing unit that stores and holds a disclosure level designated by operation for the operational unit,
wherein the communication relaying device selecting unit newly selects a communication relaying device every time the disclosure level is newly designated, by referring to the stored content of the communication relaying device information storing unit to newly acquire a communication identifier corresponding to the new disclosure level designated, and
wherein the communication relaying device identifier storing unit stores and holds the communication identifier newly acquired by the communication relaying device selecting unit every time the disclosure level is newly designated.

6. The communication terminal device according to claim 1, further comprising:
an operational unit that accepts user operation; and
a disclosure level inquiring unit that makes an inquiry to the user about which disclosure level is to be designated, upon performing the communication,
wherein the communication relaying device selecting unit selects a communication relaying device in accordance with a disclosure level designated from the user by operation for the operational unit.

7. The communication terminal device according to claim 1, further comprising a disclosure degree enhancement inquiring unit that makes an inquiry to the user about whether or not to communicate again by enhancing a disclosure degree on the attribute of the user, when a refusal notification to refuse communication is received from the communication destination terminal after performing the communication to the communication destination terminal,
wherein the communication relaying device selecting unit reselects a communication relaying device corresponding to a disclosure level with a higher disclosure degree on the attribute of the user, when an instruction to enhance the disclosure degree is received from the user, and
wherein the communication unit again performs communication to the communication destination terminal through the communication relaying device reselected by the communication relaying device selecting unit.

8. A communication terminal device comprising:
a communication relaying device existence/non-existence determining unit that determines existence or non-existence of a communication relaying device corresponding to a disclosure level designated as a disclosure level on an attribute of a user from among disclosure levels in multiple steps, among a plurality of communication relaying devices capable of relaying communication to a communication destination terminal;
a communication relaying device selecting unit that selects a communication relaying device corresponding to the designated disclosure level when it is determined that the communication relaying device corresponding to the designated disclosure level exists, and that selects a communication relaying device corresponding to a disclosure level with a lower disclosure degree on the attribute of the user than the designated disclosure level when it is determined that the communication relaying device corresponding to the designated disclosure level does not exist; and
a communication unit that communicates to the communication destination terminal through the communication relaying device selected by the communication relaying device selecting unit,
wherein an attribute of the user disclosed to the communication destination terminal at each disclosure level includes an attribute of the user disclosed at a disclosure level with a lower disclosure degree than each disclosure level.

9. The communication terminal device according to claim 8, further comprising:
an operational unit that accepts user operation; and
a disclosure level storing unit that stores and holds a disclosure level designated by operation for the operational unit,
wherein the communication relaying device existence/non-existence determining unit determines existence or non-existence of a communication relaying device in accordance with the disclosure level stored in the disclosure level storing unit.

10. The communication terminal device according to claim 8, further comprising a communication relaying device information storing unit that stores a communication identifier allocated to each of the plurality of communication relaying devices in association with the disclosure level in each step,
wherein the communication relaying device selecting unit performs the selection of the communication relaying device, by referring to a stored content of the communication relaying device information storing unit to acquire a communication identifier corresponding to the designated disclosure level, and
wherein the communication unit performs the communication to the communication destination terminal through a communication relaying device having the communication identifier acquired by the communication relaying device selecting unit.

11. A communication terminal device comprising:
a move schedule storing unit that stores a move schedule of a user;
a move schedule determining unit that determines whether or not a date of the move schedule stored in the move schedule storing unit has arrived;
a communication relaying device selecting unit that changes a communication relaying device to be selected from among a plurality of communication relaying devices that are capable of relaying communication to a communication destination terminal and that respectively correspond to disclosure levels in multiple steps on an attribute of the user, between when it is determined that the date of the move schedule has not arrived and when it is determined that the date of the move schedule has arrived; and
a communication unit that communicates to the communication destination terminal through the communication relaying device selected by the communication relaying device selecting unit,
wherein an attribution of the user disclosed to the communication destination terminal at each disclosure level includes an attribution of the user disclosed at a disclosure level with a lower disclosure degree than each disclosure level.

12. The communication terminal device according to claim 11, wherein the communication relaying device selecting unit selects, when it is determined that the date of the move schedule has not arrived, a communication relaying device corresponding to a disclosure level designated from among the disclosure levels in multiple steps, among the plurality of communication relaying devices, and selects, when it is determined that the date of the move schedule has arrived, a communication relaying device corresponding to a disclosure level with a lower disclosure degree on the attribute of the user than the designated disclosure level, among the plurality of communication relaying devices.

13. A communication system comprising:
a communication terminal device; and
a plurality of communication relaying devices capable of relaying communication from the communication terminal device to a communication destination terminal, without disclosing a communication identifier of the communication terminal device to the communication destination terminal,
wherein each of the communication relaying devices corresponds to any one of disclosure levels in multiple steps on an attribute of a user,
wherein the communication terminal device comprises:
a communication relaying device selecting unit that selects a communication relaying device corresponding to a disclosure level designated from among the disclosure levels in multiple steps, among the plurality of communication relaying devices; and
a communication unit that communicates to the communication destination terminal through the communication relaying device selected by the communication relaying device selecting unit, and
wherein an attribute of the user disclosed to the communication destination terminal at each disclosure level includes an attribute of the user disclosed at a disclosure level with a lower disclosure degree than each disclosure level.

14. The communication system according to claim 13, wherein the plurality of communication relaying devices include a communication relaying device that can be accessed only from a user belonging to a specific organization, and a communication relaying device that can be accessed only from a user belonging to a lower organization included in the specific organization.

15. The communication system according to claim 13, wherein the plurality of communication relaying devices include a communication relaying device that can be accessed from any user, and a communication relaying device that can be accessed only from a user belonging to a specific organization.

16. The communication system according to claim 13, wherein each of the communication relaying devices relays the communication without disclosing the communication identifier of the communication terminal device to the communication destination terminal, by deleting the communication identifier of the communication terminal device from data transmitted from the communication terminal device to the communication destination terminal.

17. A communication system comprising:
a communication terminal device; and
a plurality of communication relaying devices capable of relaying communication from the communication terminal device to a communication destination terminal, without disclosing a communication identifier of the communication terminal device to the communication destination terminal,
wherein each of the communication relaying devices corresponds to any one of disclosure levels in multiple steps on an attribute of a user,
wherein the communication terminal device comprises:
a communication relaying device existence/non-existence determining unit that determines existence or non-existence of a communication relaying device corresponding to a disclosure level designated from among the disclosure levels in multiple steps, among the plurality of communication relaying devices;
a communication relaying device selecting unit that selects a communication relaying device corresponding to the designated disclosure level when it is determined that the communication relaying device corresponding to the designated disclosure level exists, and that selects a communication relaying device corresponding to a disclosure level with a lower disclosure degree on the attribute of the user than the designated disclosure level when it is determined that the communication relaying device corresponding to the designated disclosure level does not exist; and
a communication unit that communicates to the communication destination terminal through the communication relaying device selected by the communication relaying device selecting unit, and
wherein an attribute of the user disclosed to the communication destination terminal at each disclosure level includes an attribute of the user disclosed at a disclosure level with a lower disclosure degree than each disclosure level.

18. A communication system comprising:
a communication terminal device; and
a plurality of communication relaying devices capable of relaying communication from the communication terminal device to a communication destination terminal, without disclosing a communication identifier of the communication terminal device to the communication destination terminal,
wherein each of the communication relaying devices corresponds to any one of disclosure levels in multiple steps on an attribute of a user, and
wherein the communication terminal device comprises:
a move schedule storing unit that stores a move schedule of the user;
a move schedule determining unit that determines whether or not a date of the move schedule stored in the move schedule storing unit has arrived;
a communication relaying device selecting unit that changes a communication relaying device to be selected among the plurality of communication relaying devices, between when it is determined that the date of the move schedule has not arrived and when it is determined that the date of the move schedule has arrived; and
a communication unit that communicates to the communication destination terminal through the communication relaying device selected by the communication relaying device selecting unit, and
wherein an attribution of the user disclosed to the communication destination terminal at each disclosure level includes an attribution of the user disclosed at a disclosure level with a lower disclosure degree than each disclosure level.

19. The communication system according to claim 18, wherein the communication relaying device selecting unit selects, when it is determined that the date of the move schedule has not arrived, a communication relaying device corresponding to a disclosure level designated from among the disclosure levels in multiple steps, among the plurality of communication relaying devices, and selects, when it is determined that the date of the move schedule has arrived, a communication relaying device corresponding to a disclosure level with a lower disclosure degree on the attribute of the user than the designated disclosure level, among the plurality of communication relaying devices.

20. A communication system comprising:
a communication terminal device;
a plurality of communication relaying devices capable of relaying communication from the communication terminal device to a communication destination terminal, without disclosing a communication identifier of the communication terminal device to the communication destination terminal; and
a relaying-device selecting device that selects a communication relaying device for relaying the communication from the communication terminal device to the communication destination terminal from among the plurality of communication relaying devices,
wherein each of the communication relaying devices corresponds to any one of disclosure levels in multiple steps on an attribute of a user,
wherein the relaying-device selecting device selects a communication relaying device corresponding to a disclosure level designated from among the disclosure levels in multiple steps, among the plurality of communication relaying devices,
wherein the communication terminal device comprises a communication unit that communicates to the communication destination terminal through the communication relaying device selected by the relaying-device selecting device, and
wherein an attribute of the user disclosed to the communication destination terminal at each disclosure level includes an attribute of the user disclosed at a disclosure level with a lower disclosure degree than each disclosure level.

21. The communication system according to claim 20, wherein
the communication terminal device transmits the designated disclosure level to the relaying-device selecting device, and
the relaying-device selecting device selects a communication relaying device corresponding the disclosure level received from the communication terminal device.

22. The communication system according to claim 20, wherein
a plurality of the communication terminal devices are provided, and
the relaying-device selecting device selects a communication relaying device for relaying communication from each of the plurality of communication terminal devices to a communication destination terminal thereof.

23. A relaying-device selecting device that selects, among a plurality of communication relaying devices capable of relaying communication from a communication terminal device to a communication destination terminal, a communication relaying device corresponding to a disclosure level designated as a disclosure level on an attribute of a user of the communication terminal device from among disclosure levels in multiple steps, and that notifies the communication terminal device of a result of the selection,
wherein an attribute of the user disclosed to the communication destination terminal at each disclosure level includes an attribute of the user disclosed at a disclosure level with a lower disclosure degree than each disclosure level.

24. The relaying-device selecting device according to claim 23, further comprising a communication relaying device information storing unit that stores a communication identifier allocated to each of the plurality of communication relaying devices in association with the disclosure level in each step,
wherein the relaying-device selecting device performs the selection of the communication relaying device by referring to a stored content of the communication relaying device information storing unit to acquire a communication identifier corresponding to the designated disclosure level, and notifies the communication terminal device of the acquired communication identifier as the result of the selection.

25. A communication method comprising:
selecting, among a plurality of communication relaying devices capable of relaying communication from a communication terminal device to a communication destination terminal, a communication relaying device corresponding to a disclosure level designated as a disclosure level on an attribute of a user of the communication terminal device from among disclosure levels in multiple steps; and
communicating, by the communication terminal device, to the communication destination terminal through the communication relaying device selected,
wherein as each communication relaying device, a device that discloses an attribute of the user including an attribute disclosed by a communication relaying device corresponding to a disclosure level with a lower disclosure degree than each disclosure level to the communication destination terminal is used.

26. The communication method according to claim 25, including:
performing the selection of the communication relaying device, by referring to a correspondence table that indicates a correspondence between a communication identifier allocated to each of the plurality of communication relaying devices and the disclosure level in each step to acquire a communication identifier corresponding to the designated disclosure level; and
performing the communication, by the communication terminal device, to the communication destination terminal through a communication relaying device having the communication identifier acquired.

27. A non-transitory computer readable medium that stores a program for causing a computer to execute a process to select, among a plurality of communication relaying devices capable of relaying communication from a communication terminal device to a communication destination terminal, a communication relaying device corresponding to a disclosure level designated as a disclosure level on an attribute of a user of the communication terminal device from among disclosure levels in multiple steps,
wherein the program causes the computer to select, as each communication relaying device, a device that discloses an attribute of the user including an attribute disclosed by a communication relaying device corresponding to a disclosure level with a lower disclosure degree than each disclosure level to the communication. destination terminal.

* * * * *